(12) United States Patent
Marinovici et al.

(10) Patent No.: US 11,736,556 B1
(45) Date of Patent: Aug. 22, 2023

(54) SYSTEMS AND METHODS FOR USING A BROWSER TO CARRY OUT ROBOTIC PROCESS AUTOMATION (RPA)

(71) Applicant: UiPath Inc., New York, NY (US)

(72) Inventors: Razvan Marinovici, Bucharest (RO); Ion Miron, Bucharest (RO)

(73) Assignee: UiPath Inc., New York, NY (US)

( * ) Notice: Subject to any disclaimer, the term of this patent is extended or adjusted under 35 U.S.C. 154(b) by 0 days.

(21) Appl. No.: 17/657,536

(22) Filed: Mar. 31, 2022

Related U.S. Application Data

(63) Continuation of application No. 17/657,532, filed on Mar. 31, 2022.

(51) Int. Cl.
*H04L 67/025* (2022.01)
*H04L 67/141* (2022.01)

(52) U.S. Cl.
CPC .......... *H04L 67/025* (2013.01); *H04L 67/141* (2013.01)

(58) Field of Classification Search
CPC . H04L 67/025; H04L 67/141; H04L 41/0253; G06F 9/45529; H04N 1/00464; H04N 21/8173
See application file for complete search history.

(56) References Cited

U.S. PATENT DOCUMENTS

| | | | |
|---|---|---|---|
| 8,407,321 B2 | 3/2013 | Mickens | |
| 10,491,548 B2 | 11/2019 | Xie | |
| 10,654,166 B1 | 5/2020 | Hall | |
| 10,846,153 B2 | 11/2020 | Balasubramanian et al. | |
| 10,853,114 B2 | 12/2020 | Agarwal et al. | |
| 10,885,423 B1 | 1/2021 | Voicu | |
| 11,055,067 B2 | 7/2021 | Thangaraj et al. | |
| 11,117,259 B2 | 9/2021 | Hall | |
| 11,130,233 B2 | 9/2021 | Hall | |
| 11,157,339 B1 | 10/2021 | Dines | |

(Continued)

FOREIGN PATENT DOCUMENTS

| | | | |
|---|---|---|---|
| CN | 111429083 A | 7/2020 | |
| CN | 112486073 A | 3/2021 | |

(Continued)

OTHER PUBLICATIONS

Clointfusion, "ClointFusion: Python based Automation (RPA) Platform," downloaded from https://dev.to/clointfusion/clointfusion-python-based-automation-rpa-platform-4hoc, document dated Nov. 9, 2021.

(Continued)

*Primary Examiner* — Michael Won
(74) *Attorney, Agent, or Firm* — Law Office of Andrei D Popovici, PC

(57) ABSTRACT

In some embodiments, a robotic process automation (RPA) agent executing within a browser window/tab interacts with an RPA driver executing outside of the browser. A bridge module establishes a communication channel between the RPA agent and the RPA driver. In one exemplary use case, the RPA agent receives a robot specification from a remote server, the specification indicating at least one RPA activity, and communicates details of the respective activity to the RPA driver via the communication channel. The RPA driver identifies a runtime target for the RPA activity within the target web page and executes the respective activity.

19 Claims, 13 Drawing Sheets

(56) References Cited

U.S. PATENT DOCUMENTS

| | | |
|---|---|---|
| 11,233,861 B2 | 1/2022 | Hall |
| 2011/0239141 A1 | 9/2011 | Wang |
| 2012/0124495 A1 | 5/2012 | Amichai |
| 2013/0283185 A1 | 10/2013 | Mock |
| 2016/0259773 A1 | 9/2016 | Jadhav |
| 2016/0275092 A1 | 9/2016 | Black |
| 2017/0147296 A1 | 5/2017 | Kumar |
| 2017/0277625 A1 | 9/2017 | Shtuchkin |
| 2017/0315782 A1 | 11/2017 | Chaudhry |
| 2018/0173614 A1 | 6/2018 | Gong |
| 2018/0189170 A1 | 7/2018 | Dwarakanath |
| 2018/0197123 A1* | 7/2018 | Parimelazhagan ............ G06Q 10/0633 |
| 2019/0056107 A1* | 2/2019 | Desai .................. F23N 1/002 |
| 2019/0303269 A1 | 10/2019 | Arieli |
| 2020/0004798 A1 | 1/2020 | Weinert, Jr. et al. |
| 2020/0050983 A1 | 2/2020 | Balasubramanian |
| 2020/0073729 A1* | 3/2020 | Sturtivant ............... G06F 9/541 |
| 2020/0242017 A1 | 7/2020 | Konyshev |
| 2020/0249964 A1 | 8/2020 | Fernandes |
| 2020/0348960 A1* | 11/2020 | Krishnamurthy ... G06F 9/45504 |
| 2020/0348964 A1 | 11/2020 | Anand et al. |
| 2020/0401431 A1 | 12/2020 | Rashid et al. |
| 2021/0129325 A1 | 5/2021 | Yu et al. |
| 2021/0133799 A1* | 5/2021 | Adibi .................. G10L 15/1815 |
| 2021/0152414 A1* | 5/2021 | Busbee ............... H04L 43/0817 |
| 2021/0252703 A1 | 8/2021 | Hall |
| 2022/0012152 A1 | 1/2022 | Dines |
| 2022/0107624 A1* | 4/2022 | Amin ................... G06Q 10/109 |
| 2022/0197674 A1* | 6/2022 | Ginoya ............... G06F 9/44521 |

FOREIGN PATENT DOCUMENTS

| | | |
|---|---|---|
| CN | 113177474 A | 7/2021 |
| CN | 113238850 A | 8/2021 |
| CN | 113254174 A | 8/2021 |
| JP | 2019075084 A | 5/2019 |

OTHER PUBLICATIONS

Uipath Inc., U.S. Appl. No. 17/684,713, filed Jan. 24, 2022.
Uipath Inc., U.S. Appl. No. 17/684,717, filed Jan. 24, 2022.
USPTO, Office Action dated Mar. 31, 2023 for U.S. Appl. No. 17/648,713, filed Jan. 24, 2022.
USPTO, Office Action dated Jun. 20, 2023 for U.S. Appl. No. 17/648,717, filed Jan. 24, 2022.

\* cited by examiner

SYSTEMS AND METHODS FOR USING A BROWSER TO CARRY OUT ROBOTIC PROCESS AUTOMATION (RPA)

RELATED APPLICATIONS

This application is a continuation of U.S. patent application Ser. No. 17/657,532, filed on Mar. 31, 2022, entitled "Systems and Methods for Using a Browser to Design Robotic Process 10 Automation (RPA) Robots," which is herein incorporated by reference.

BACKGROUND

The invention relates to robotic process automation (RPA), and in particular to carrying out RPA activities within a web browser.

RPA is an emerging field of information technology aimed at improving productivity by automating repetitive computing tasks, thus freeing human operators to perform more intellectually sophisticated and/or creative activities. Notable tasks targeted for automation include extracting structured data from documents (e.g., invoices, webpages) and interacting with user interfaces, for instance to fill in forms, send email, and post messages to social media sites, among others.

A distinct drive in RPA development is directed at extending the reach of RPA technology to a broad audience of developers and industries spanning multiple hardware and software platforms.

SUMMARY

According to one aspect, a method comprises employing at least one hardware processor of a computer system to execute a web browser application, an RPA driver, and a bridge module. The bridge module is configured to set up a communication channel between the web browser application and the RPA driver. The web browser application is configured to receive a specification of an RPA workflow from a remote server computer and to select an RPA activity for execution from the RPA workflow, the RPA activity comprising mimicking an action of a user on a target element of a target user interface (UI) exposed by the computer system. The web browser application is further configured to transmit a set of target identification data characterizing the target element via the communication channel. The RPA driver executes outside of the web browser application and is configured to receive the set of target identification data via the communication channel; in response, to identify the target element within the target UI according to the target identification data, and to carry out the RPA activity.

According to another aspect, a computer system comprises at least one hardware processor configured to execute a web browser application, an RPA driver, and a bridge module. The bridge module is configured to set up a communication channel between the web browser application and the RPA driver. The web browser application is configured to receive a specification of an RPA workflow from a remote server computer and to select an RPA activity for execution from the RPA workflow, the RPA activity comprising mimicking an action of a user on a target element of a target UI exposed by the computer system. The web browser application is further configured to transmit a set of target identification data characterizing the target element via the communication channel. The RPA driver executes outside of the web browser application and is configured to receive the set of target identification data via the communication channel; in response, to identify the target element within the target UI according to the target identification data, and to carry out the RPA activity.

According to another aspect, a non-transitory computer-readable medium stores instructions which, when executed by at least one hardware processor of a computer system, causes the computer system to execute an RPA driver and a bridge module. The bridge module is configured to set up a communication channel between the web browser application and the RPA driver. The web browser application is configured to receive a specification of an RPA workflow from a remote server computer and to select an RPA activity for execution from the RPA workflow, the RPA activity comprising mimicking an action of a user on a target element of a target UI exposed by the computer system. The web browser application is further configured to transmit a set of target identification data characterizing the target element via the communication channel. The RPA driver executes outside of the web browser application and is configured to receive the set of target identification data via the communication channel; in response, to identify the target element within the target UI according to the target identification data, and to carry out the RPA activity.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A process is an instance of a computer program, the instance characterized by having at least an execution thread and a separate virtual memory space assigned to it, wherein a content of the respective virtual memory space includes executable code. A browser process is a process belonging to a web browser application, such as Google Chrome®. Software is said to execute within a browser when the respective software is executed by a browser process; otherwise the respective software is said to execute outside of the browser. The term 'database' is used herein to denote any organized, searchable collection of data. Computer-readable media encompass non-transitory media such as magnetic, optic, and semiconductor storage media (e.g., hard drives, optical disks, flash memory, DRAM), as well as communication links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation.

Figure 1:
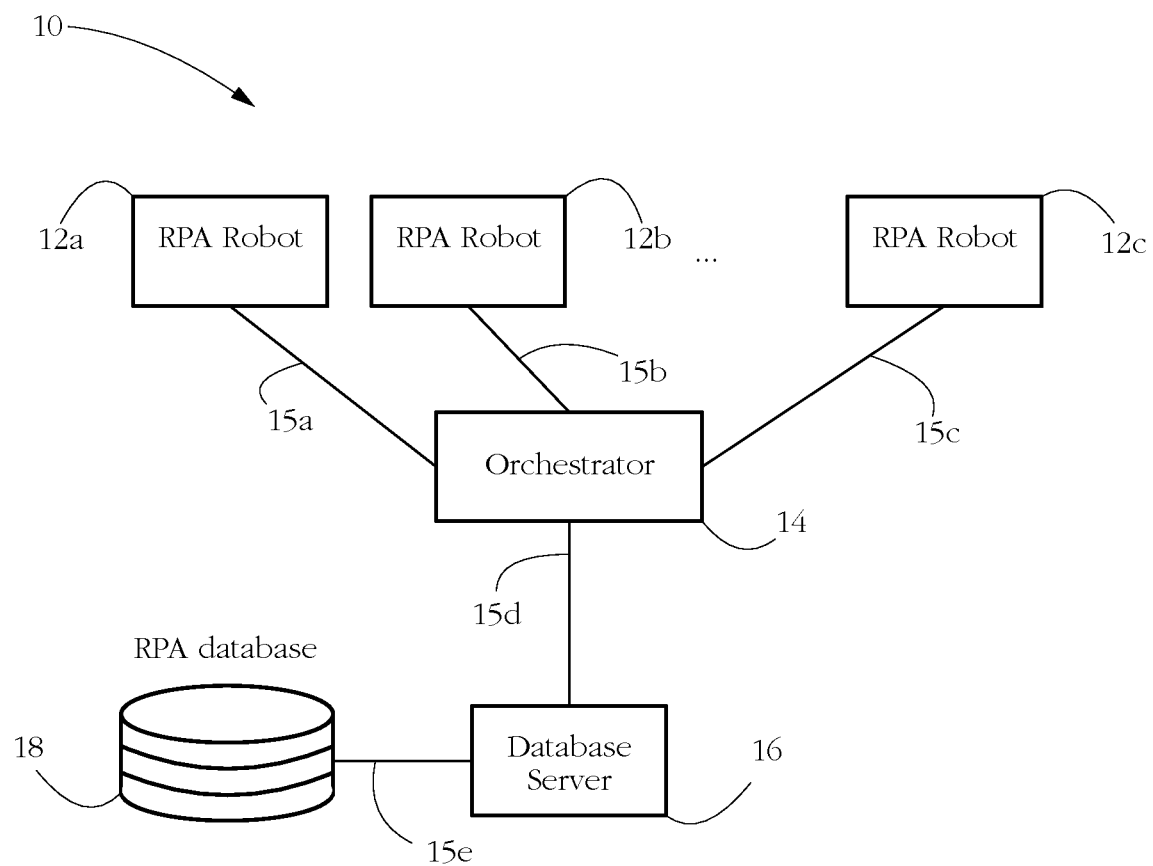
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To carry out the respective task, the employee performs a sequence of operations/actions, such as opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on a computing device, as well as reproducing a result of the human operator's performing the respective operation. For instance, mimicking an action of clicking a button of a graphical user interface (GUI) may comprise having the operating system move the mouse pointer to the respective button and generating a mouse click event, or may alternatively comprise directly toggling the respective GUI button to a clicked state.

Activities typically targeted for RPA automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a sequence of human actions. A workflow herein denotes a sequence of custom automation steps, herein deemed RPA activities. Each RPA activity includes at least one action performed by the robot, such as clicking a button, reading a file, writing to a spreadsheet cell, etc. Activities may be nested and/or embedded. In some embodiments, RPA design application 30 exposes a user interface and set of tools that give the developer control of the execution order and the relationship between RPA activities of a workflow. One commercial example of an embodiment of RPA design application 30 is UiPath StudioX®. In some embodiments of the present invention, at least a part of RPA design application 30 may execute within a browser, as described in detail below.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
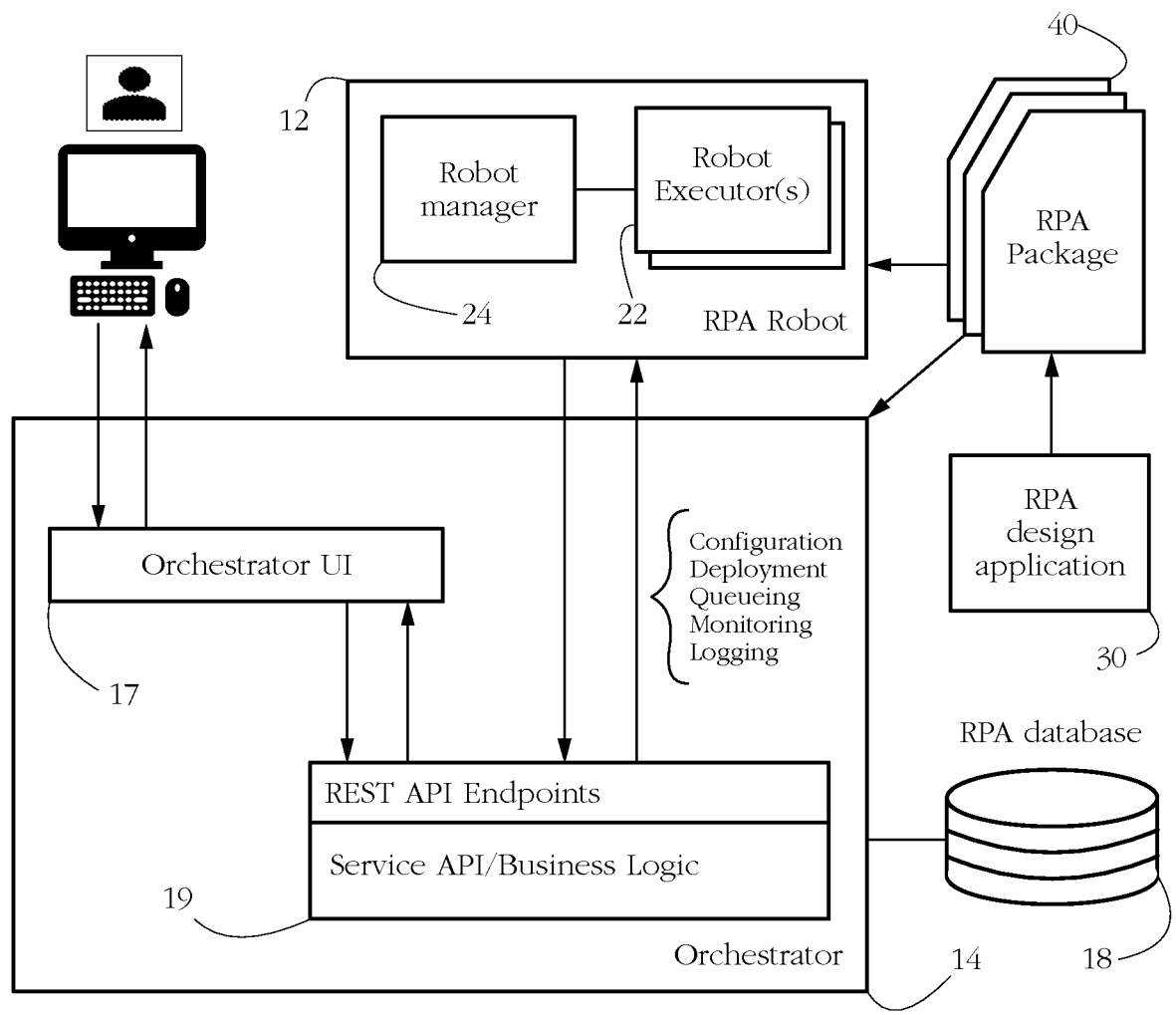
FIG. 2 illustrates exemplary components and operation of an RPA robot and orchestrator according to some embodiments of the present invention.
Figure 3:
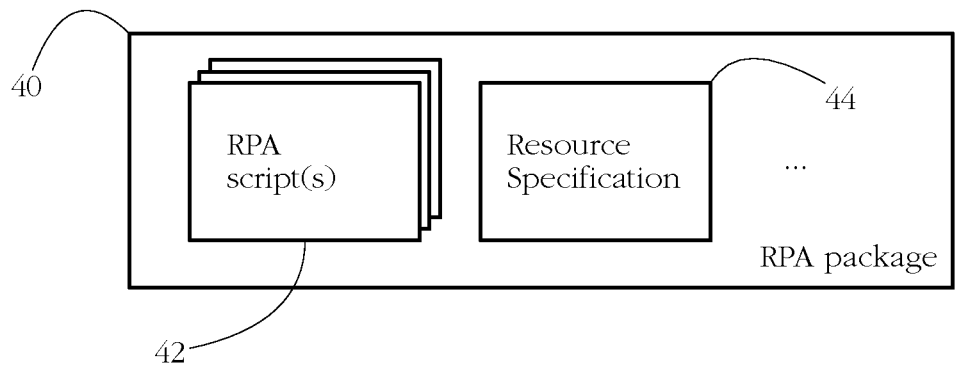
FIG. 3 illustrates exemplary components of an RPA package according to some embodiments of the present invention.

Once an RPA workflow is developed, it may be encoded in computer-readable form and exported as an RPA package 40 (FIG. 2). In some embodiments as illustrated in FIG. 3, RPA package 40 includes a set of RPA scripts 42 comprising set of instructions for a software robot. RPA script(s) 42 may be formulated according to any data specification known in the art, for instance in a version of an extensible markup language (XML), JavaScript® Object Notation (JSON), or a programming language such as C#, Visual Basic®, Java®, JavaScript®, etc. Alternatively, RPA script(s) 42 may be formulated in an RPA-specific version of bytecode, or even as a sequence of instructions formulated in a natural language such as English, Spanish, Japanese, etc. In some embodiments, RPA scripts(s) 42 are pre-compiled into a set of native processor instructions (e.g., machine code).

In some embodiments, RPA package 40 further comprises a resource specification 44 indicative of a set of process resources used by the respective robot during execution. Exemplary process resources include a set of credentials, a computer file, a queue, a database, and a network connection/communication link, among others. Credentials herein generically denote private data (e.g., username, password) required for accessing a specific RPA host machine and/or for executing a specific software component. Credentials may comprise encrypted data; in such situations, the executing robot may possess a cryptographic key for decrypting the respective data. In some embodiments, credential resources may take the form of a computer file. Alternatively, an exemplary credential resource may comprise a lookup key (e.g., hash index) into a database holding the actual credentials. Such a database is sometimes known in the art as a credential vault. A queue herein denotes a container holding an ordered collection of items of the same type (e.g., computer files, structured data objects). Exemplary queues include a collection of invoices and the contents of an email inbox, among others. The ordering of queue items may indicate an order in which the respective items should be processed by the executing robot.

In some embodiments, for each process resource, specification 44 comprises a set of metadata characterizing the respective resource. Exemplary resource characteristics/metadata include, among others, an indicator of a resource type of the respective resource, a filename, a filesystem path and/or other location indicator for accessing the respective resource, a size, and a version indicator of the respective resource. Resource specification 44 may be formulated according to any data format known in the art, for instance as an XML, or JSON script, a relational database, etc.

A skilled artisan will appreciate that RPA design application 30 may comprise multiple components/modules, which may execute on distinct physical machines. In one example, RPA design application 30 may execute in a client-server configuration, wherein one component of application 30 may expose a robot design interface to a user of a client computer, and another component of application 30 executing on a server computer may assemble the robot workflow and formulate/output RPA package 40. For instance, a developer may access the robot design interface via a web browser executing on the client computer, while the software formulating package 40 actually executes on the server computer.

Once formulated, RPA script(s) 42 may be executed by a set of robots 12*a-c* (FIG. 1), which may be further controlled and coordinated by an orchestrator 14. Robots 12*a-c* and orchestrator 14 may each comprise a plurality of computer programs, which may or may not execute on the same physical machine. Exemplary commercial embodiments of robots 12*a-c* and orchestrator 14 include UiPath Robots® and UiPath Orchestrator®, respectively. In some embodiments of the present invention, at least a part of an RPA robot 12*a-c* may execute within a browser, as described in detail below.

Types of robots 12*a-c* include, but are not limited to, attended robots, unattended robots, development robots (similar to unattended robots, but used for development and testing purposes), and nonproduction robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 controls and coordinates the execution of multiple robots 12*a-c*. As such, orchestrator 14 may have various capabilities including, but not limited to, provisioning, deployment, configuration, scheduling, queueing, monitoring, logging, and/or providing interconnectivity for robots 12*a-c*. Provisioning may include creating and maintaining connections between robots 12*a-c* and orchestrator 14. Deployment may include ensuring the correct delivery of software (e.g, RPA scripts 42) to robots 12*a-c* for execution. Configuration may include maintenance and delivery of robot environments, resources, and workflow configurations. Scheduling may comprise configuring robots 12*a-c* to execute various tasks according to specific schedules (e.g., at specific times of the day, on specific dates, daily, etc.). Queueing may include providing management of job queues. Monitoring may include keeping track of robot state and maintaining user permissions. Logging may include storing and indexing logs to a database and/or another storage mechanism (e.g., SQL, ElasticSearch®, Redis®). Orchestrator 14 may further act as a centralized point of communication for third-party solutions and/or applications.

FIG. 2 shows exemplary components of a robot 12 and orchestrator 14 according to some embodiments of the present invention. An exemplary RPA robot 12 is constructed using a Windows® Workflow Foundation Application Programming Interface from Microsoft, Inc. Robot 12 may comprise a set of robot executors 22 and a robot manager 24. Robot executors 22 are configured to receive RPA script(s) 42 indicating a sequence of RPA activities that mimic the actions of a human operator, and to automatically perform the respective sequence of activities on the respective client machine. In some embodiments, robot executor(s) 22 comprise an interpreter (e.g., a just-in-time interpreter or compiler) configured to translate RPA script(s) 42 into a runtime object comprising processor instructions for carrying out the RPA activities encoded in the respective script(s). Executing script(s) 42 may thus comprise executor(s) 22 translating RPA script(s) 42 and instructing a processor of the respective host machine to load the resulting runtime package into memory and to launch the runtime package into execution.

Robot manager 24 may manage the operation of robot executor(s) 22. For instance, robot manager 24 may select tasks/scripts for execution by robot executor(s) 22 according to an input from a human operator and/or according to a schedule. Manager 24 may start and stop jobs and configure various operational parameters of executor(s) 22. When robot 12 includes multiple executors 22, manager 24 may coordinate their activities and/or inter-process communication. Manager 24 may further manage communication between RPA robot 12, orchestrator 14 and/or other entities.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and robot manager 24 may execute on a client side. Robot 12 may run several jobs/workflows concurrently. Robot manager 24 (e.g., a Windows® service) may act as a single client-side point of contact of multiple executors 22. Manager 24 may further manage communication between robot 12 and orchestrator 14. In some embodiments, communication is initiated by manager 24, which may open a WebSocket channel to orchestrator 14. Manager 24 may subsequently use the channel to transmit notifications regarding the state of each executor 22 to orchestrator 14, for instance as a heartbeat signal. In turn, orchestrator 14 may use the channel to transmit acknowledgements, job requests, and other data such as RPA script(s) 42 and resource metadata to robot 12.

Orchestrator 14 may execute on a server side, possibly distributed over multiple physical and/or virtual machines. In one such embodiment, orchestrator 14 may include an orchestrator user interface (UI) 17 which may be a web application, and a set of service modules 19. Several examples of an orchestrator UI are discussed below. Service modules 19 may include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on a selected robot 12, creating robot groups/pools, assigning workflows to robots, adding/removing data to/from queues, scheduling jobs to run unattended, analyzing logs per robot or workflow, etc. Orchestrator UI 17 may be implemented using Hypertext Markup Language (HTML), JavaScript®, or any other web technology.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and/or configure users, robots, permissions, credentials and/or other process resources, etc. Logging REST endpoints may be used to log different information, such as errors, explicit messages sent by the robots, and other environment-specific information, for instance. Deployment REST endpoints may be used by robots to query the version of RPA script(s) 42 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and robot manager 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various individual robots or robot pools, as well as data characterizing workflows executed by various robots, data associating workflows with the robots tasked with executing them, data characterizing users, roles, schedules, queues, etc. Another exemplary category of data stored and/or retrieved by database server 16 includes data characterizing the current state of each executing robot. Another exemplary data category stored and/or retrieved by database server 16 includes RPA resource metadata characterizing RPA resources required by various workflows, for instance default and/or runtime values of various resource attributes such as filenames, locations, credentials, etc. Yet another exemplary category of data includes messages logged by various robots during execution. Database server 16 and database 18 may employ any data storage protocol and format known in the art, such as structured query language (SQL), ElasticSearch®, and Redis®, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15a-e interconnecting various members of environment 10. Such links may be implemented according to any method known in the art, for instance as virtual network links, virtual private networks (VPN), or end-to-end tunnels. Some embodiments further encrypt data circulating over some or all of links 15a-e.

Figure 4:
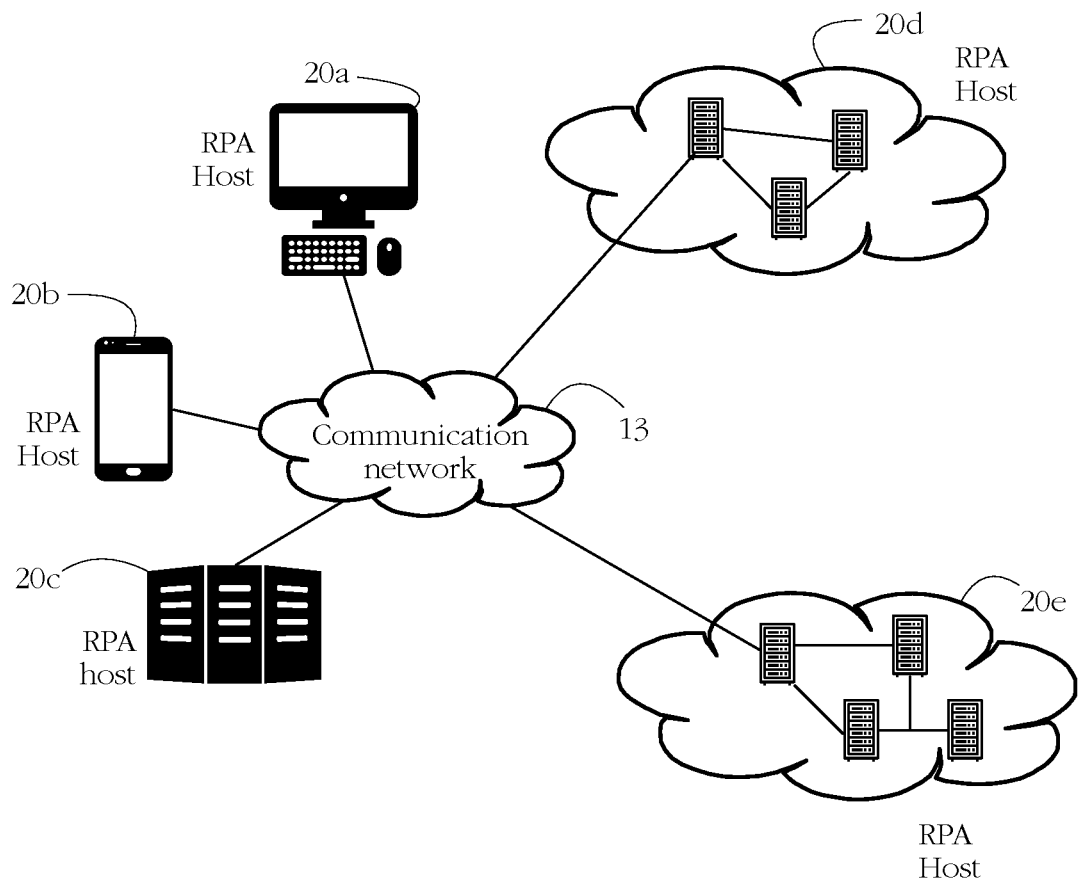
FIG. 4 shows a variety of RPA host systems according to some embodiments of the present invention.

A skilled artisan will understand that various components of RPA environment 10 may be implemented and/or may execute on distinct host computer systems (physical appliances and/or virtual machines). FIG. 4 shows a variety of such RPA host systems 20a-e according to some embodiments of the present invention. Each host system 20a-e represents a computing system (an individual computing appliance or a set of interconnected computers) having at least a hardware processor and a memory unit for storing processor instructions and/or data. Exemplary RPA hosts 20a-c include corporate mainframe computers, personal computers, laptop and tablet computers, mobile telecommunication devices (e.g., smartphones), and e-book readers, among others. Other exemplary RPA hosts illustrated as items 20d-e include a cloud computing platform comprising a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure® SDK and AWS® SDK, among others. RPA hosts 20a-e may be communicatively coupled by a communication network 13, such as the Internet.

Figure 5:
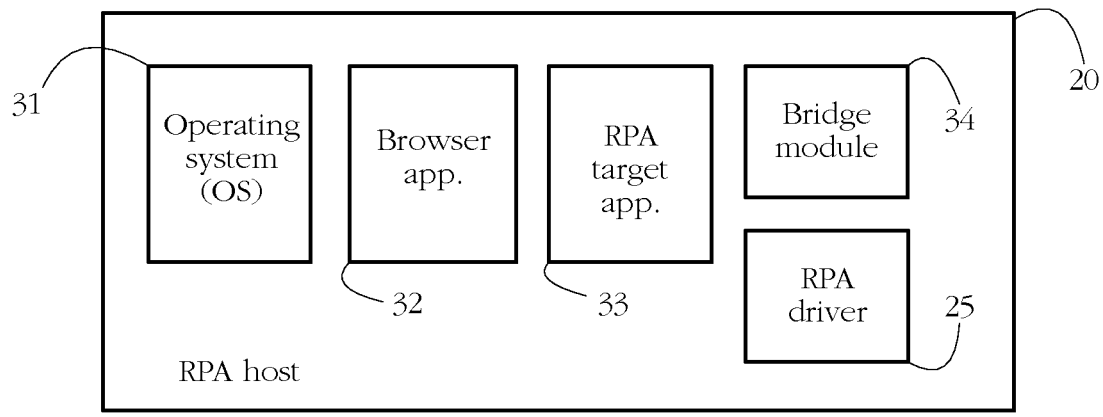
FIG. 5 shows exemplary software components executing on an RPA host system according to some embodiments of the present invention.

FIG. 5 shows exemplary software executing on an RPA host 20 according to some embodiments of the present invention, wherein host 20 may represent any of RPA hosts 20a-e in FIG. 4. An operating system (OS) 31 may comprise any widely available operating system such as Microsoft Windows®, MacOS®, Linux®, iOS®, or Android®, among others, comprising a software layer that interfaces between the hardware of the respective RPA host and other software applications, such as a web browser application 32, an RPA target application 33, a bridge module 34, and an RPA driver 25, among others. Browser application 32 herein denotes any software whose primary purpose is to fetch and render web content (web pages). Exemplary browser application 32 includes any instance of a commercial web browser, such as Google Chrome®, Microsoft Edge®, and Mozilla Firefox®, among others. Modern web browsers typically allow displaying multiple web documents concurrently, for instance in separate windows or browser tabs. For computer security reasons, in some such applications, each distinct browser window, tab, and/or frame may be rendered by a distinct web browser process isolated from other web browser processes executing on the respective host. In some embodiments, at least a part of RPA robot 12 and/or a part of RPA design application 30 executes within browser 32, as shown in detail below.

RPA target application 33 generically represents any software application targeted for automation. Examples include an instance of a word processing application (e.g., Microsoft Word®, TextEdit®, Pages®), an instance of a spreadsheet application (e.g., Microsoft Excel®, Numbers®), an instance of an electronic communication application (e.g., Mozilla Thunderbird®, WhatsApp®), an instance of a web browser (e.g., Google Chrome®, Mozilla Firefox®), and an instance of a business management application (e.g., SAP®), among others. In some embodiments, a single RPA robot may interact with multiple target applications. For instance, the robot may be configured to scrape some data from a web page and paste it into an Excel® worksheet. An artisan will therefore know that FIG. 5 showing just one RPA target application 33 is not meant to be limiting.

In some embodiments, automation activities are carried out by interfacing with a set of RPA drivers 25 executing on the respective RPA host. Driver(s) 25 generically represent software modules that perform low-level operations such as determining a current on-screen position of a cursor/pointer, moving a cursor/pointer, registering and/or executing mouse, keyboard, and/or touchscreen events, detecting a current posture/orientation of a handheld device, detecting a current accelerometer reading, taking a photograph with a smartphone camera, etc. Other exemplary operations of driver(s) 25 comprise identifying an element of a user interface (e.g., a button, a form field), changing the on-screen appearance of the respective element (e.g., color, position, size), drawing a shape, etc. Some such drivers 25 may form a part of operating system 31 or may call native functions of the local OS. Other drivers 25 may implement various application-specific aspects of a user's interaction with complex target applications 33 such as SAP®, Citrix® virtualization software, Excel®, etc. Such drivers 25 may include, for instance, browser drivers, virtualization drivers, and enterprise application drivers, among others. An exemplary browser driver may be embodied as a set of scripts injected into a browser process and/or into a web page currently rendered within a browser window, and may be configured to construct, parse, and/or modify a document object model (DOM) of the respective web page. Other exemplary drivers 25 include the Microsoft WinAppDriver, XCTest drivers from Apple, Inc., and UI Automator drivers from Google, Inc.

In some embodiments, RPA host 20 further executes a bridge module 34 configured to establish a communication channel between browser 32 and RPA driver 25, as shown in more detail below. A communication channel herein denotes any means of transferring data between the respective entities. Exemplary communication channels include a mechanism of sharing a region of a memory of RPA host 20 (e.g., a memory page) between the respective entities, a network socket (i.e., transferring data via a network interface or communication port of RPA host 20), a pipe, a file, and message passing, among others. In some embodiments, bridge module 34 comprises a computer program installed locally on RPA host 20 and executing independently of any browser process. However, to facilitate communication with the browser, some embodiments of bridge module 34 may comprise a component executing within the browser, such as a browser extension computer program as further described below. The term 'browser extension' herein denotes an add-on, custom computer program that extends the native functionality of a browser application, and that executes within the respective browser application. For security reasons, browser extensions typically execute within a browser process separate from the one that exposes the RPA interface as described below, but this aspect may be browser-specific and is not meant to be limiting.

Figure 6:
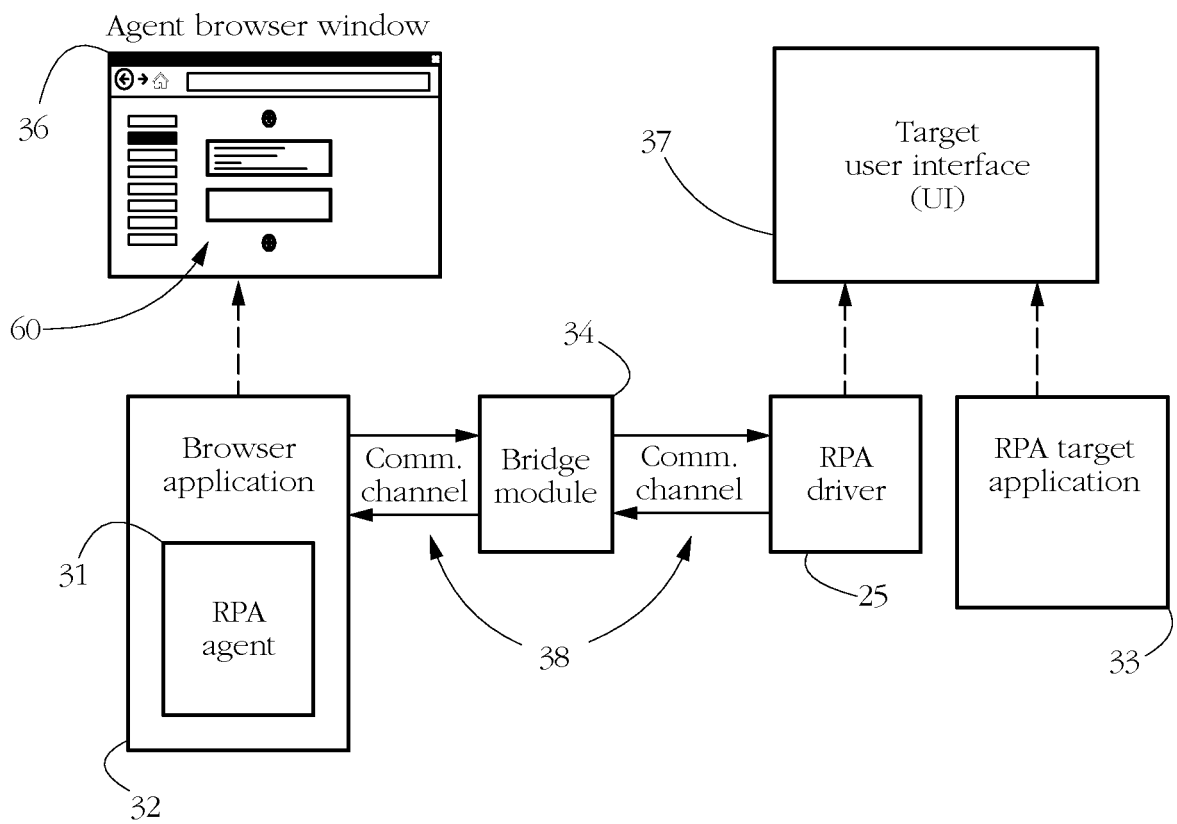
FIG. 6 illustrates an exemplary software configuration using a browser to facilitate RPA activities according to some embodiments of the present invention.

FIG. 6 shows an exemplary software configuration using a browser to facilitate RPA activities according to some embodiments of the present invention. In the illustrated configuration, browser 32 exposes an agent browser window 36 to a user of the respective RPA host. Window 36 may represent, for instance, a distinct tab opened by an instance of a commercial web browser application such as Google Chrome®. Some embodiments then use agent browser window 36 to expose an RPA interface 60 enabling the user to perform various RPA operations, such as designing an RPA robot and executing an RPA robot, among others. Such use cases will be explored separately below.

Some modern browsers can render documents that include snippets of executable code. Examples of such executable code may control how the content of the respective document is displayed to a user and/or how the user interacts with the respective content, may manage the distribution and display of third-party content (e.g., advertising, weather, stock market updates), may gather various kinds of data characterizing the browsing habits of the respective user, etc. Such executable code may be embedded in or hyperlinked from the respective document. Exemplary browser-executable code may be pre-compiled or formulated in a scripting language or bytecode for runtime interpretation or compilation. Exemplary scripting languages include JavaScript® and VBScript®, among others. To enable execution of scripted code, some browsers include an interpreter configured to translate the received script/bytecode into a form suitable for execution on the respective host platform, and provide a hosting environment for the respective code to run in.

Some embodiments of the present invention use such code interpretation features of the browser to implement the functionality of RPA interface 60 for designing and/or executing RPA robots. In one such example, the functionality of RPA interface 60 is encoded as a set of scripts (e.g., JavaScript®) collectively represented as an RPA agent 31 and executed by browser 32. Agent 31 may be downloaded from a script repository/server, for instance by pointing browser 32 to a pre-determined uniform resource locator (URL) indicating an address of agent 31.

Figure 7:
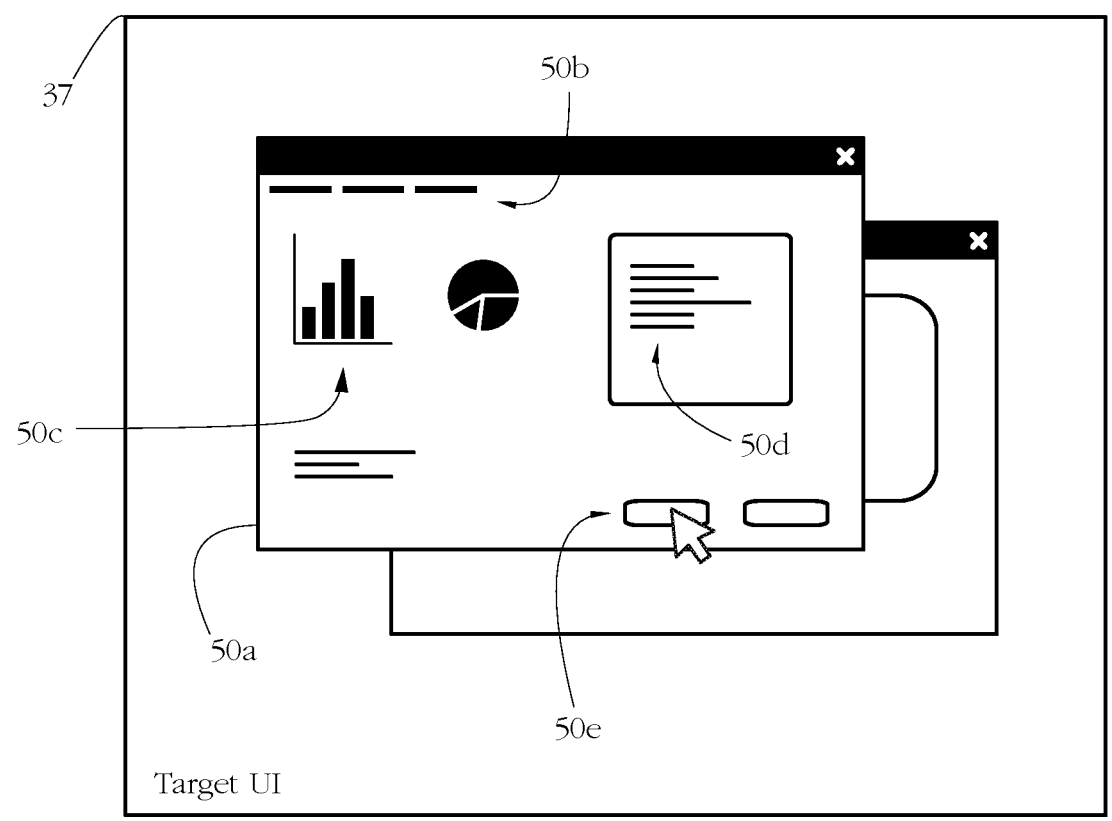
FIG. 7 shows an exemplary generic user interface (UI) according to some embodiments of the present invention.

FIG. 6 further shows RPA target application 33 exposing a target UI 37 to the user. Target UI 37 generically represents any user interface targeted for automation. A common example of target UI 37 comprises a graphical user interface (GUI), which enables human-machine interaction via a set of visual elements displayed to the user. FIG. 7 shows such an exemplary target UI 37 having a set of exemplary UI elements including a window 50a, a menu indicator 50b, an icon 50c, a text box 50d, and a button 50e, among others. Other exemplary UI elements comprise a label, a form, an individual form field, a toggle, a link (e.g., a hyperlink, hypertext, uniform resource identifier), etc. UI elements may display information, receive input (text, mouse events), and/or control a functionality of software and/or the respective RPA host device.

Some embodiments employ an instance of RPA driver 25 (FIG. 6) to interact with target UI 37. For instance, driver 25 may identify an element of target UI 37 and perform an RPA activity (e.g., a mouse click, a swipe, etc.) on the respective element. In another example, RPA driver 25 may automatically detect a user's action (e.g., mouse click, swipe, etc.) and in response, identify the UI element targeted by the respective action and determine a set of features identifying the respective target element among other elements of target UI 37, as further described below. RPA driver 25 may execute on RPA host 20 at a relatively high processor privilege level (e.g., kernel mode) and may call native functions of the local OS. In some embodiments wherein RPA target application 33 is capable of script/bytecode interpretation, at least a part of RPA driver 25 may execute within the respective instance of RPA target application 33. Stated otherwise, driver 25 may be executed by a process belonging to application 33. In one such example wherein RPA target application comprises a web browser, target UI 37 comprises a target browser window distinct from agent browser window 36 (e.g., another browser tab), and RPA driver 25 executes within a browser process distinct from the one executing RPA agent 31. In some embodiments, at least a part of RPA driver 25 may be dynamically injected into target application 33 or into a document currently rendered within target UI 37 and removed after it has accomplished its task.

Some embodiments employ distinct instances of RPA driver 25 to interact with distinct target UIs. In one such example wherein a robot is configured to read data from one target UI (e.g., a spreadsheet) and to paste it into another UI (e.g., an email program), the respective operations may be carried out by two distinct RPA drivers. In some embodiments, each driver may use a distinct communication channel to communicate with RPA agent 31.

FIG. 6 further shows bridge module 34 setting up and/or operating a communication channel 38 between browser 32 and RPA driver 25. In some embodiments as illustrated, bridge module 34 acts as an intermediary between the two communicating entities, so that module 34 may intercept, analyze, and/or alter some of the data exchanged between RPA agent 31 and RPA driver 25 before forwarding it to its intended destination. In some embodiments, bridge module 34 may further expose an additional user interface distinct from RPA interface 60 and target UI 37 and/or generate a display according to at least some of data exchanged via communication channel 38. The operation of bridge module 34 will be further detailed below.

Robot Design Embodiments

Figure 8:
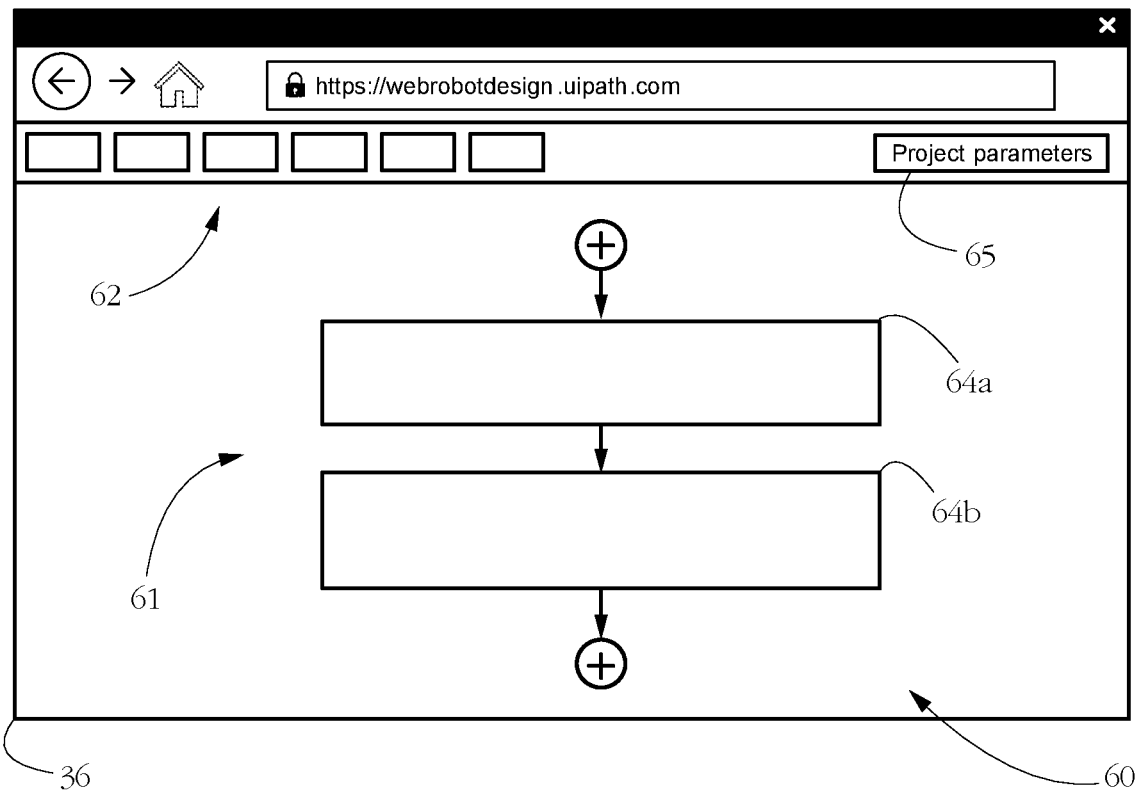
FIG. 8 shows an exemplary robot design interface exposed by a browser according to some embodiments of the present invention.

In some embodiments, RPA interface 60 implements some of the functionality of RPA design application 30, for instance a robot design interface as illustrated in FIG. 8, enabling the user to design an automation/software robot. Interface 60 is exposed to the user within agent browser window 36, and its functionality is provided by RPA agent 31 executed by browser 32. An artisan will understand that the content and appearance of the illustrated interface are only exemplary and not meant to be limiting. Interface 60 may comprise various regions, for instance a menu region 62 and a workflow design region 61. Menu region 62 may enable a user to select individual RPA activities for execution by an RPA robot. Activities may be grouped according to various criteria, for instance, according to a type of user interaction (e.g., clicking, tapping, gestures, hotkeys), according to a type of data (e.g., text-related activities, image-related activities), according to a type of data processing (e.g., navigation, data scraping, form filling), etc. In some embodiments, individual RPA activities may be reached via a hierarchy of menus.

In some embodiments, interface 60 may expose a project configuration control 65 (e.g., a menu button displayed within menu area 62) which, when invoked, enables a user to set various parameters of the automation project currently under development, such as a name, a location of an asset, and an execution schedule of the respective robot/automation, among others. Other parameters adjustable via control 65 may include selected parameters of communication channel 38. For instance, when channel 38 comprises a local file, the user may be able to indicate a location (e.g., local folder) for the file used to transfer data between browser 32 and driver 25. In another example wherein channel 38 comprises a network connection/socket, the user may be able to indicate a network address, a port number, etc., to be used by browser 32 and/or driver 25 during inter-process communications.

Figure 9:
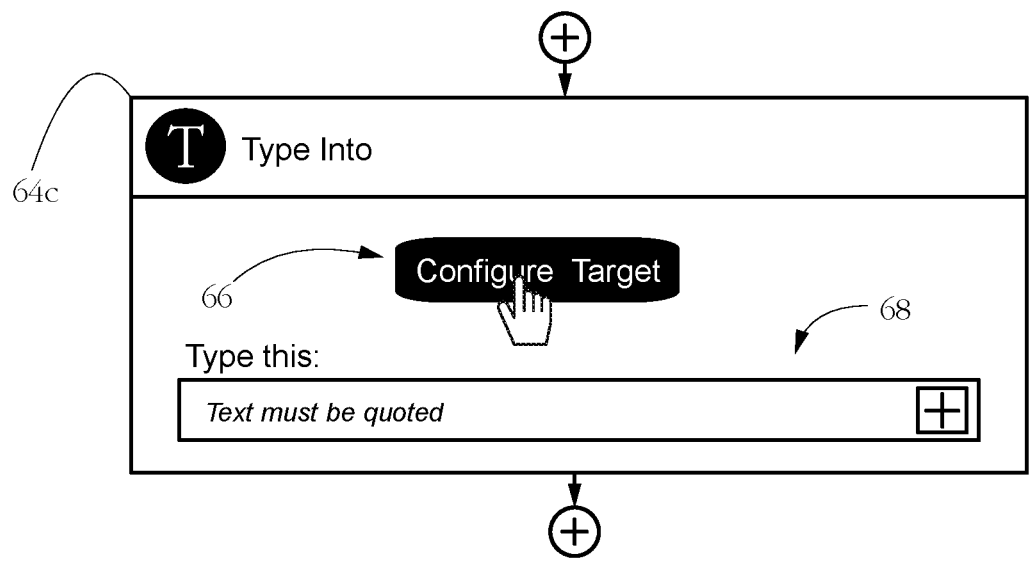
FIG. 9 shows an exemplary activity configuration interface according to some embodiments of the present invention.

Workflow design region 61 may display a diagram (e.g., flowchart) of an activity sequence reproducing the flow of a business process currently being automated. The interface may expose various controls enabling the user to add, delete, and re-arrange activities of the sequence. Each RPA activity may be configured independently, by way of an activity configuration UI illustrated as items 64a-b in FIG. 8. User interfaces 64a-b may comprise children windows of interface 60. FIG. 9 shows an exemplary activity configuration interface 64c in more detail according to some embodiments of the present invention. Exemplary interface 64c configures a 'Type Into' activity (e.g., filling a form field) and exposes a set of fields, for instance an activity name field and a set of activity parameter fields configured to enable the user to set various parameters of the current activity. In the example of FIG. 9, parameter field 68 may receive a text to be written to the target form field. The user may provide the input text either directly, or in the form of an indicator of a source of the respective input text. Exemplary sources may include a specific cell/column/row of a spreadsheet, a current value of a pre-defined variable (for instance a value resulting from executing a previous RPA activity of the respective workflow), a document located at a specified URL, another element from the current target document, etc.

Another exemplary parameter of the current RPA activity is the operand/target of the respective activity, herein denoting the element of target UI 37 that the RPA robot is supposed to act on. In one example wherein the selected activity comprises a mouse click, the target element may be a button, a menu item, a hyperlink, etc. In another example wherein the selected activity comprises filling out a form, the target element may be the specific form field that should receive the input. The activity configuration interface may enable the user to indicate the target element by way of a target configuration control 66 as illustrated in FIG. 9. Clicking or tapping control 66 may trigger the display of a target configuration interface and/or initiate a target acquisition procedure. Some embodiments may expose a menu/list of candidate targets for selection. In a preferred embodiment, the user may indicate a target for the current RPA activity directly within target UI 37, for instance by clicking or tapping it. In such examples, RPA interface 60 collaborates with RPA driver 25 for target acquisition, in that RPA driver 25 may detect the user's interaction with target UI 37 and communicate data back to RPA interface 60.

Figure 10:
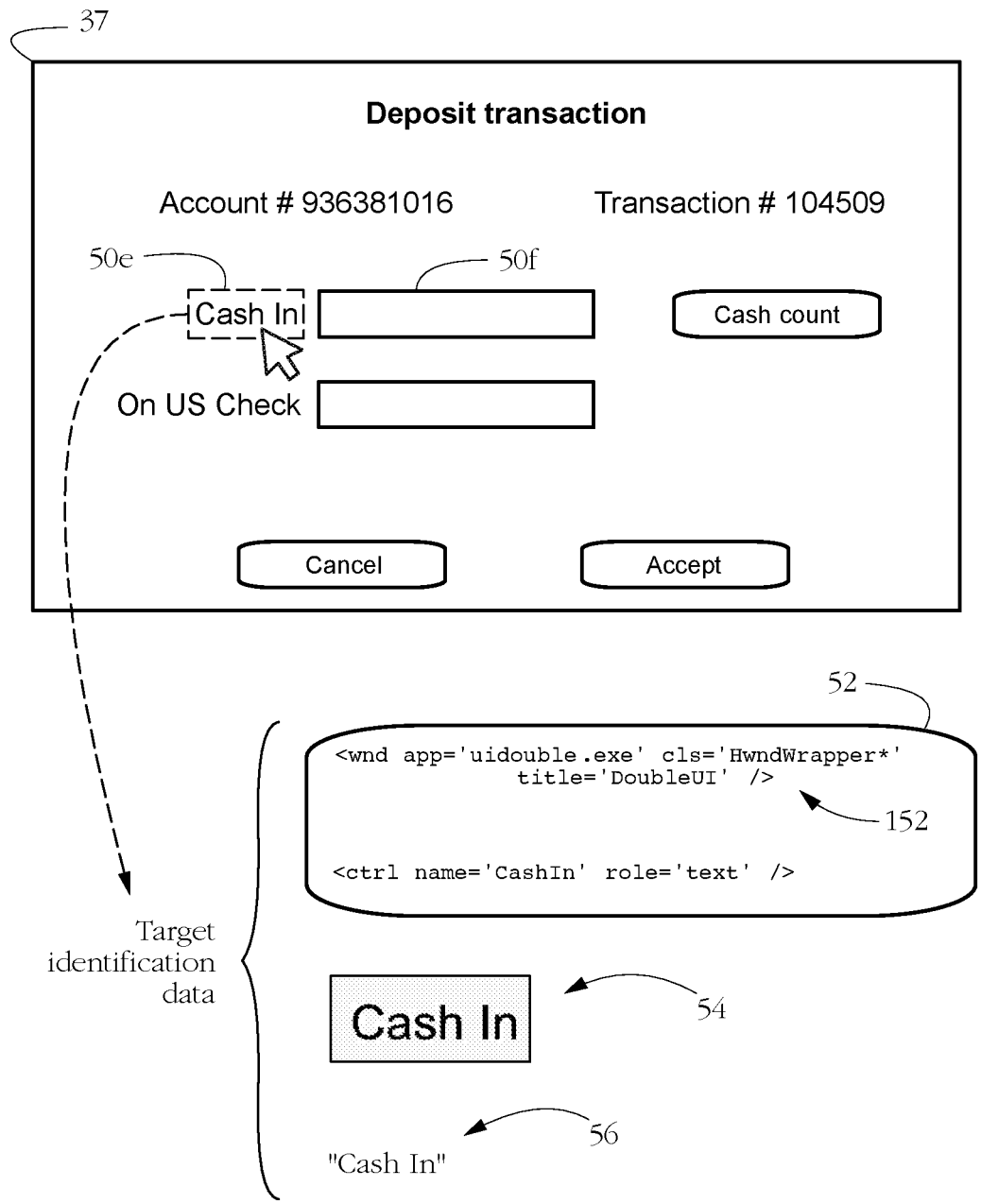
FIG. 10 shows an exemplary target UI and a set of target identification data according to some embodiments of the present invention.

In some embodiments, RPA driver 25 is configured to analyze a user's input to determine a set of target identification data characterizing an element of target UI 37 selected as a target for the current RPA activity. FIG. 10 illustrates an exemplary target UI 37 comprising multiple UI elements such as an exemplary input field 50f and a field label 50e, among others. FIG. 10 further shows an exemplary set of target identification data characterizing field label 50e according to some embodiments of the present invention. Target identification data herein denotes any set of features that identify the respective UI element among other elements of the respective UI.

In some embodiments, target identification data includes a selector 52 comprising characteristic features extracted from a source code representation of the respective UI element. The term 'source code' is herein understood to denote a programmatic/internal representation of a content displayed by the user interface, as opposed to a user-facing appearance of the respective content. In the case of web documents, typically source code comprises a version of hypertext markup language (HTML), but an artisan will know that other languages such as extensible markup languages (XML) and scripting languages such as JavaScript® may equally apply.

Features of the target UI element may be encoded using any method known in the art, for instance as a set of attribute-value pairs. In an XML example, selector 52 may comprise a set of tags, each tag consisting of a sequence of characters, the sequence book-ended by implementation-specific delimiters (in the current example, each tag begins with <and ends with/>). Each tag may comprise a set of attribute-value pairs encoding specific characteristics of the respective object. The format and content of such tags may vary according to the application exposing target UI 37. For instance, a selector identifying an element of a HTML document (e.g., web page) may read:
<html app='chrome.exe' title='Selectors—Just an example'/>
<webctrl tag='H1'/>

An exemplary selector of a SAP® UI element may read:
<wnd app='saplogon.exe' cls='SAP_FRONTEND_SESSION' title='SAP'/>
<sap id='usr/txtRSYST-BNAME'/>

An exemplary selector of a Java™ UI element may read:
<wnd app='java.exe' cls='SunAwtFrame' title='SwingSet2'/>
<java role='page tab list'/>
<java name='Internal Frames Demo' role='page tab'/>
<java name='Internal Frame Generator' role='internal frame'/>
<java role='push button' idx='4'/>

In some embodiments, selector 52 comprises a set of attribute-value pairs collectively indicating a location of the respective element within a tree representation of target UI 37 (e.g, UI tree). In such embodiments, RPA driver 25 may be configured to construct, edit, and/or modify a UI tree (e.g., a DOM) of target UI 37, and to compute selector 52 according to the respective UI tree.

In the example of FIG. 10, selector 52 comprises an application ID 152 indicative of a type of application exposing the respective target UI (in the current example, an instance of a binary named 'uidouble.exe'). Application ID 152 may include an identifier of a window displaying the respective target UI, to distinguish the respective window/interface from other windows/interfaces currently displayed by RPA host 20. For instance, application ID 152 may comprise a window name, a name of a document currently displayed within the target UI, a URL of a web page currently loaded within the target UI, etc.

Exemplary target identification data may further comprise a target image 54 comprising an encoding of a user-facing image of the respective target element. For instance, target image 54 may comprise an array of pixel values corresponding to a limited region of a screen currently displaying the target element, and/or a set of values computed according to the respective array of pixel values (e.g., a JPEG or wavelet representation of the respective array of pixel values). In some embodiments, target image 54 comprises a content of a clipping of a screen image located within the bounds of the respective target element.

Target identification data may further include a target text 56 comprising a computer encoding of a text (sequence of alphanumeric characters) displayed within the screen boundaries of the respective target element. Target text 56 may be determined according to a source code of the respective target UI and/or according to a result of applying an optical character recognition (OCR) procedure to a region of the screen currently showing the target element.

In some embodiments, target identification data characterizing a target element further includes identification data (e.g., selector, image, text, etc.) characterizing at least one other UI element of target UI 37, herein deemed an anchor element. An anchor herein denotes any element co-displayed with the target element, i.e., simultaneously visible with the target element in at least some views of target UI 37. In some embodiments, the anchor element is selected from UI elements displayed in the vicinity of the target element, such as a label, a title, an icon or other graphical element, etc. Taking the target interface illustrated in FIG. 10 as an example, when designing a robot configured to fill in the "Cash In" input field, field 50f is the target element, while possible anchors include label 50e, the input field labeled 'On US Check', the form title 'Deposit transaction', and the button labelled 'Cash Count', among others. In some embodiments, RPA driver 25 is configured to automatically select an anchor element in response to the user selecting a target of an RPA activity, as further detailed below. Including anchor-characteristic data may facilitate the runtime identification of the target, especially wherein identification based on characteristics of the target element alone may fail, for instance when the target UI has multiple elements similar to the target. A form may have multiple 'Last Name' fields, for instance when configured to receive information about multiple individuals. In such cases, a target identification strategy based solely on searching for a input field labelled 'Last Name' may run into difficulties, whereas further relying on an anchor may remove the ambiguity.

Figure 11:
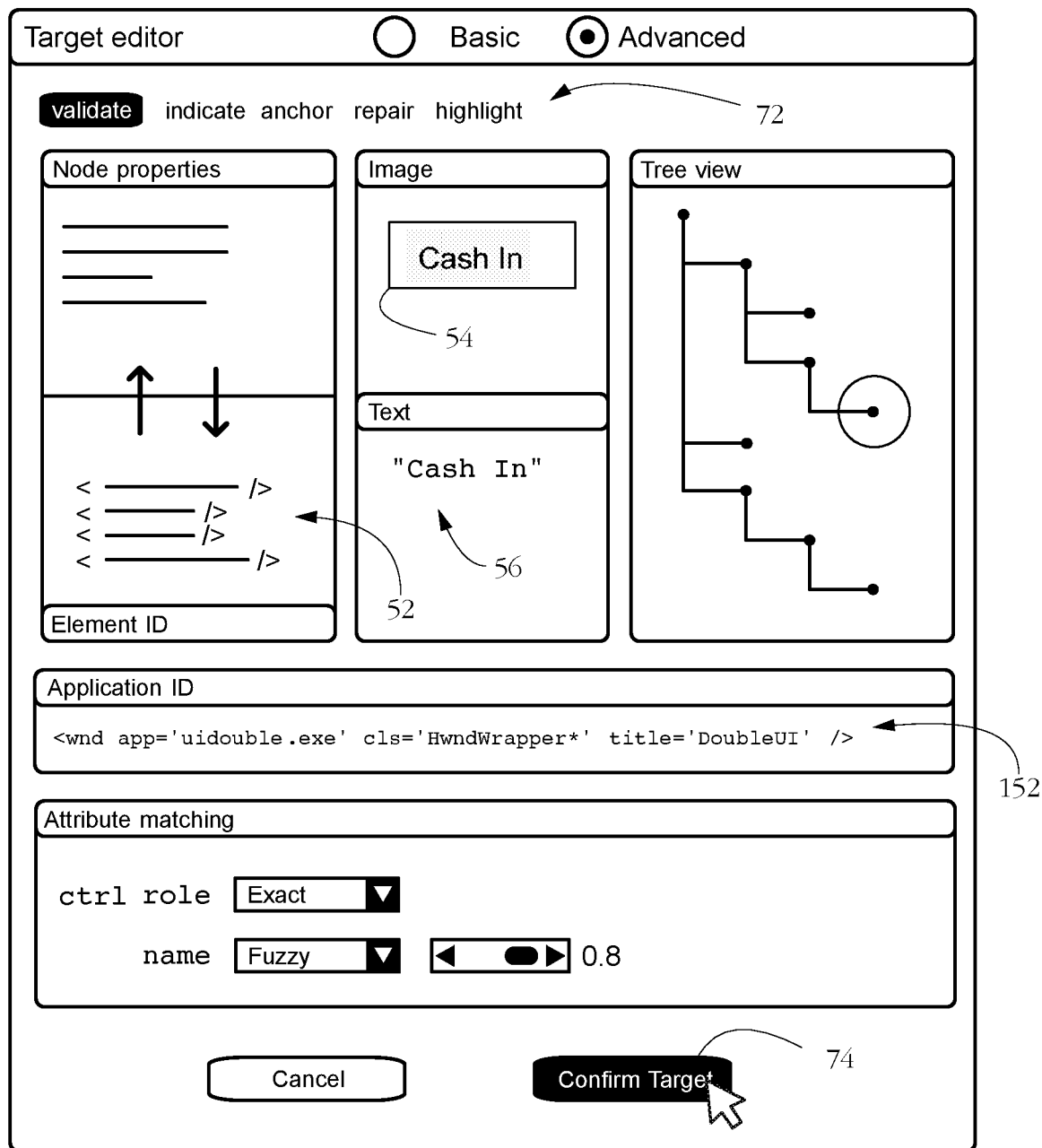
FIG. 11 shows an exemplary target configuration interface according to some embodiments of the present invention.

In some embodiments, activating target configuration control 66 (FIG. 9) triggers the display of a target configuration interface enabling the user to visualize and edit target identification data characterizing the currently selected target element. FIG. 11 shows an example of such a target configuration interface 70, which may be displayed by RPA agent 31. Alternatively, an instance of interface 70 may be displayed by bridge module 34 in a dedicated window.

Target configuration interface 70 may comprises a menu 72 including various controls, for instance a button for indicating a target element and for editing target identification data, a button for validating a choice of target and/or a selection of target identification data, a button for selecting an anchor element associated with the currently selected target element and for editing anchor identification data, and a troubleshooting button, among others. The currently displayed exemplary view allows configuring and/or validating identification features of a target element; a similar view may be available for configuring identification features of anchor elements.

Interface 70 may be organized in various zones, for instance an area for displaying a tree representation (e.g., a DOM) of target UI 37, which allows the user to easily visualize the currently selected target element as a node in the respective UI tree/DOM. Target configuration interface 70 may further display at least a part of selector 52, allowing the user to visualize currently defined tags and/or attribute-value pairs characterizing the respective target element. Some embodiments may further include a tag builder pane enabling the user to select which tags and/or attributes to include in selector 52.

Some embodiments display application ID 152 separately from other target identification data, for instance in a dedicated area of interface 70 as illustrated in FIG. 11. Such a manner of display relies on the observation that an identifier of RPA target application 33 is of relatively high importance to the user and thus may benefit from a prominent position within the interface. Displaying application ID 152 may facilitate robot design and avoid mistakes by clearly communicating the scope of the current RPA activity, e.g., 'the robot is writing to an Excel® sheet named 'Invoices'. An artisan will understand that the illustrated manner of displaying application ID 152 is not meant to be limited; other embodiments may use other visual representations for target application 33 and/or the target document currently rendered within target UI 37.

Target configuration interface 70 may further comprise areas for displaying target image 54, target text 56, and/or an attribute matching pane enabling the user to set additional matching parameters for individual tags and/or attributes. In one example, the attribute matching pane enables the user to instruct the robot on whether to use exact or approximate matching to identify the runtime instance of the respective target element. Exact matching requires that the runtime value of a selected attribute exactly match the respective design-time value included in the target identification data for the respective target element. Approximate matching may require only a partial match between the design-time and runtime values of the respective attribute. For attributes of type text, exemplary kinds of approximate matching include regular expressions, wildcard, and fuzzy matching, among others. Similar configuration fields may be exposed for matching anchor attributes.

In some embodiments, target configuration interface 70 further exposes a control (e.g., confirmation button 74) which enables the user to validate a choice of target element. In response to activating the respective control, some embodiments may transmit target identification data to RPA agent 31 via communication channel 38.

A typical robot design session may start with the user opening an instance of RPA interface 60 within agent browser window 36, for instance by fetching RPA agent 31 from a remote server such as orchestrator 14 (FIGS. 1-2), and using browser 32 to execute agent 31. In some embodiments, the user may further launch an instance of bridge module 34 on the respective RPA host (alternatively, module 34 may be pre-loaded into a memory of RPA host 20).

Figure 12:
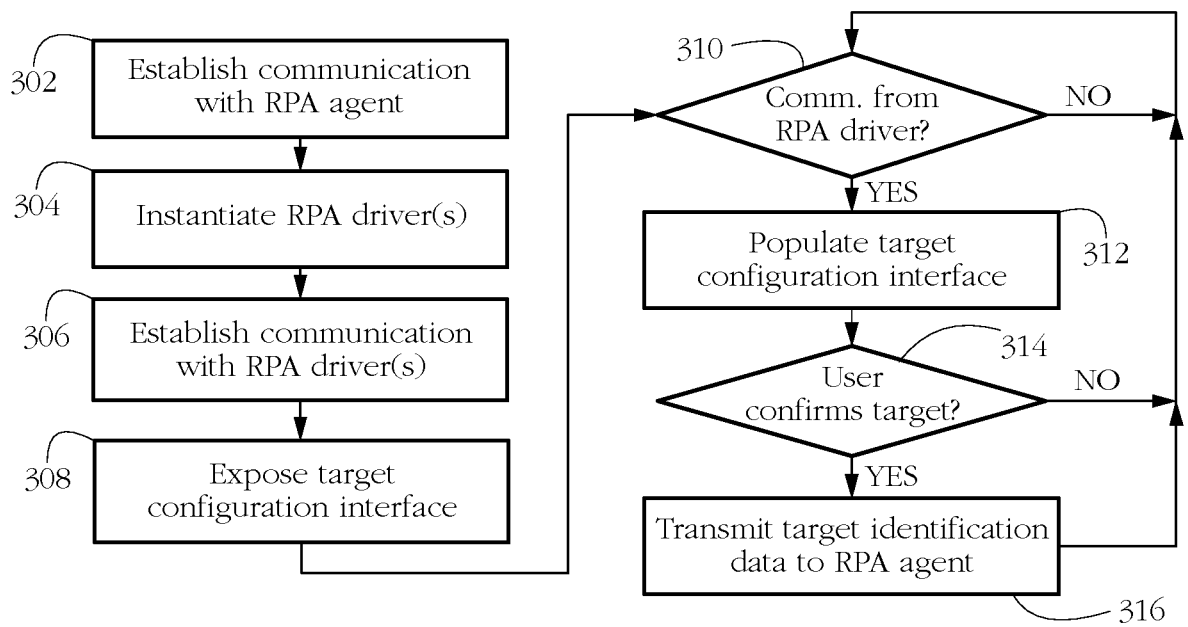
FIG. 12 illustrates an exemplary sequence of steps carried out by a bridge module in a robot design embodiment of the present invention.

FIG. 12 shows an exemplary sequence of steps performed by bridge module 34 in some robot design embodiments of the present invention. Without loss of generality, the illustrated sequence may apply to an embodiment as illustrated in FIG. 6, wherein bridge module 34 intermediates communication between RPA agent 31 and RPA driver 25, and further displays target configuration interface 70 within a separate window exposed by RPA host 20.

In a step 302, bridge module 34 may collaborate with RPA agent 31 to establish a communication channel. Various embodiments may use different types of communication channel, some of which are detailed below:

i) Communication Via a Local Messaging Service

Some browsers such as Google Chrome® allow a restricted mode of communication with software executing outside of the browser. The term 'restricted' herein indicates that the browser is not allowed to communicate with arbitrary software (for instance to prevent execution of malicious software and/or the exfiltration of sensitive data), but only with selected software pre-registered as a local messaging host with the respective browser. Registration procedures may be browser- and/or version-specific, but they may comprise for instance including an indicator of a location (e.g., path indicator) of a file comprising executable code of bridge module 34 in a configuration file (e.g., manifest) of the respective browser or extension. Some embodiments of the present invention use this mechanism to set up a communication channel between agent 31/browser 32 and bridge module 34. In such embodiments, the local browser may execute a browser extension, typically within a browser process distinct from the one executing agent 31. Some embodiments further register bridge module 34 as a local messaging host for the respective browser extension. Such registration operations may be carried out during installation/initial setup of bridge module 34 and associated browser extension on the respective RPA host. Once module 34 is registered with the browser, step 302 may comprise, for instance, RPA agent 31 setting up a runtime.Port object to hold data exchanged during communications between agent 31 and module 34.

ii) Communication Via a Remote Server

In some embodiments, communication between RPA agent 31 and bridge module 34 is carried out via a remote server, for instance a part of orchestrator 14. In some embodiments, communication parameters such as a port number, server address, etc., may be set by the user via a dedicated control exposed within RPA interface 60 (see e.g., button 65 in FIG. 8). In one such example, step 302 may comprise instructing the remote server to set up a container (e.g., a file or a database object) for holding data exchanged between agent 31 and bridge module 34. The name and/or location/URL of the respective container may be automatically generated using an algorithm available to both agent 31 and bridge module 34 independently, so that agent 31 and module 34 agree on the same communication parameters. Some embodiments may further use an identifier of the respective RPA host, an identifier of the respective instance of agent 31, and/or an identifier of the current project name (among others), to compute a container ID that is uniquely associated to the current automation/robot design. To ensure the confidentiality of the data, a key exchange protocol may be employed to generate cryptographic tokens/keys which may then be used to encrypt and decrypt communications. The actual communication between agent 31 and bridge module 34 may then be carried out via HTTP requests to the respective remote server, using a push and/or pull protocol, for instance.

iii) Communication Via a Local Server

Some embodiments may employ a local server (e.g., localhost) for communication between RPA agent 31 and bridge module 34. In such embodiments, bridge module 34 may include, or may interface with, a local server module. For instance, module 34 may be configured to listen on a specific communication port of the local server. Meanwhile, RPA agent 31 may send data to bridge module 34 by way of an HTTP request directed to the respective port of the local server. To avoid collisions, the port number may be specific to the respective instance of RPA agent 31 and/or to the respective automation project/robot. In some embodiments, communication parameters such as a port number, etc., may be set by the user via a dedicated control exposed within RPA interface 60 (see e.g., button 65 in FIG. 8).

iv) Communication Via a Datafile

In embodiments wherein the browser allows writing to and reading from a file, step 302 may comprise creating a local file which will act as a container for the data being transmitted between RPA agent 31 and bridge module 34. In a manner similar to the one described above in relation to using a remote server, the file name and/or location of the respective container may be generated independently by agent 31 and module 34 and may be unique to the respective automation project/robot. In an alternative embodiment, parameters such as a file name and location may be explicitly configured by the user, for instance via a dedicated control exposed within RPA interface 60 (see e.g., button 65 in FIG. 8). Some embodiments may require using a browser extension to read from and/or write from the respective file.

In a step 304 (FIG. 12), bridge module 34 may instantiate RPA driver(s) 25. In some embodiments, module 34 may inject an instance of RPA driver 25 into applications that support script interpretation (e.g., browsers). A step 306 may establish inter-process communications with the instantiated drivers, thus completing the setup of communication channel 38 (FIG. 6).

In some embodiments, in a step 308, bridge module 34 exposes target configuration interface 70. In a step 310, module 34 may then listen for communications from RPA driver 25; such communications may comprise target identification data as shown below. In response to such communications, a step 312 may populate interface 70 with the respective target identification data (e.g., selector 52, application ID 152, image 54, text 56, etc.), enabling the user to review, edit, and/or validate the respective choice of target element. In some embodiments, step 312 may further comprise receiving user input comprising changes to the target identification data (e.g., adding or removing tags or attribute-value pairs to/from selector 52, setting attribute matching parameters, etc.). When the user validates the current target identification data (a step 314 returns a YES), in a step 316 module 34 may forward the respective target identification data to RPA agent 31 via the established communication channel.

Figure 13:
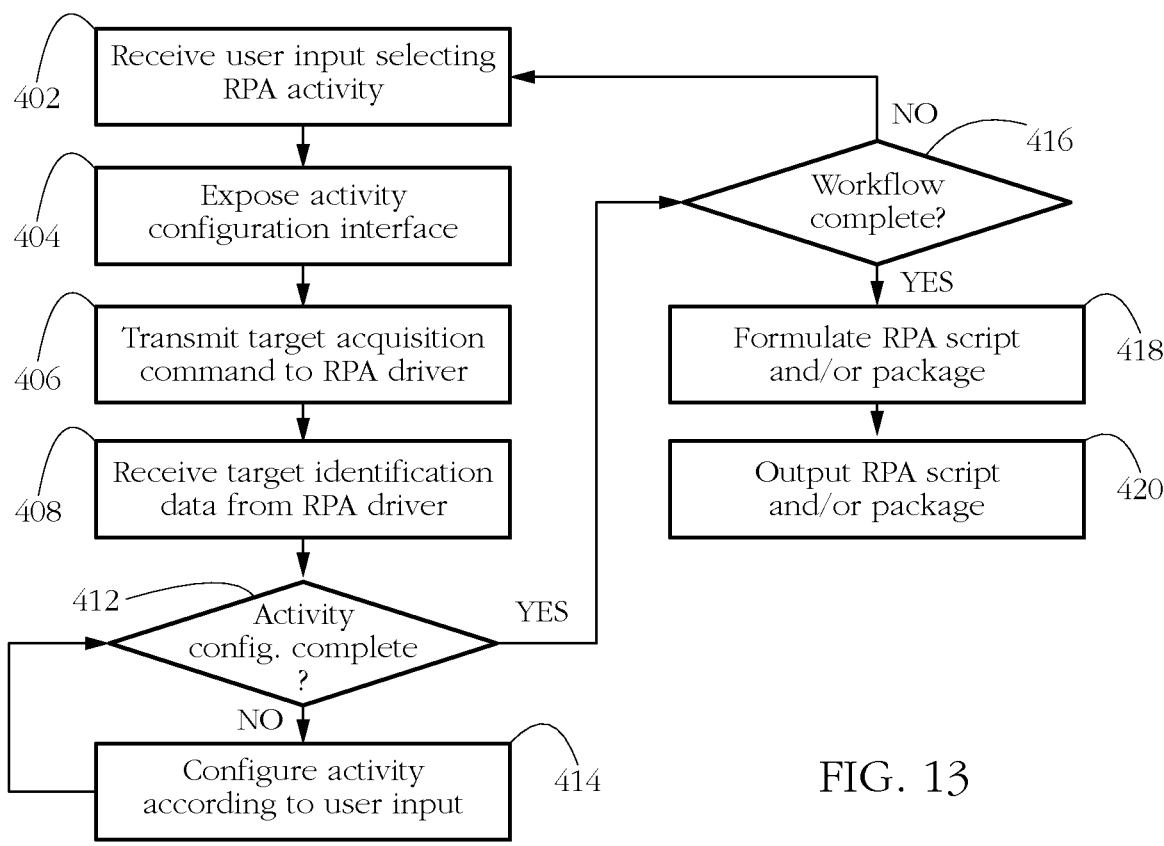
FIG. 13 shows an exemplary sequence of steps performed by an RPA agent in a robot design embodiment of the present invention.

FIG. 13 shows an exemplary sequence of steps carried out by RPA agent 31 in a robot design embodiment of the present invention. In response to exposing a robot design interface within agent browser window 36 (see e.g., exemplary RPA interface 60 in FIG. 8 and associated description above), a step 402 may receive a user input selecting an RPA activity for execution by the robot. For instance, the user may select a type of RPA activity (e.g., type into a form field) from an activity menu of interface 60. In response, a step 404 may expose an activity configuration interface such as the exemplary interface 54c illustrated in FIG. 8 (description above).

The user may then be instructed to select a target for the respective activity from the webpage displayed within target browser window 36b. In some embodiments, in a sequence of steps 406-408 RPA agent 31 may signal to RPA driver 25 to acquire target identification data, and may receive the respective data from RPA driver 25 (more details on target acquisition are given below). Such data transfers occur over communication channel 38 (see FIG. 6). A step 414 may receive user input configuring various other parameters of the respective activity, for instance what to write to the target input field 50f in the exemplary form illustrated in FIG. 10, etc. When a user input indicates that the configuration of the current activity is complete (a step 412 returns a YES), a step 416 determines whether the current workflow is complete. When no, RPA agent 31 may return to step 402 to receive user input for configuring other RPA activities. When a user input indicates that the current workflow is complete, a sequence of steps 418-420 may formulate the RPA scripts/package specifying the respective robotic workflow and output the respective robot specification. RPA scripts 42 and/or package 40 may include, for each RPA activity of the respective workflow, an indicator of an activity type and a set of target identification data characterizing a target of the respective activity. In some embodiments, step 420 may comprise saving RPA package 40 to a computer-readable medium (e.g., local hard drive of RPA host 20) or transmitting package 40 to a remote server for distribution to executing RPA robots 12 and/or orchestrator 14.

In an alternative embodiment, instead of formulating an RPA script or package 40 for an entire robotic workflow, RPA agent 31 may formulate a specification for each individual RPA activity complete with target identification data, and transmit the respective specification to a remote server computer (e.g., orchestrator 14), which may then assemble RPA package 40 describing the entire designed workflow from individual activity data received from RPA agent 31.

Figure 14:
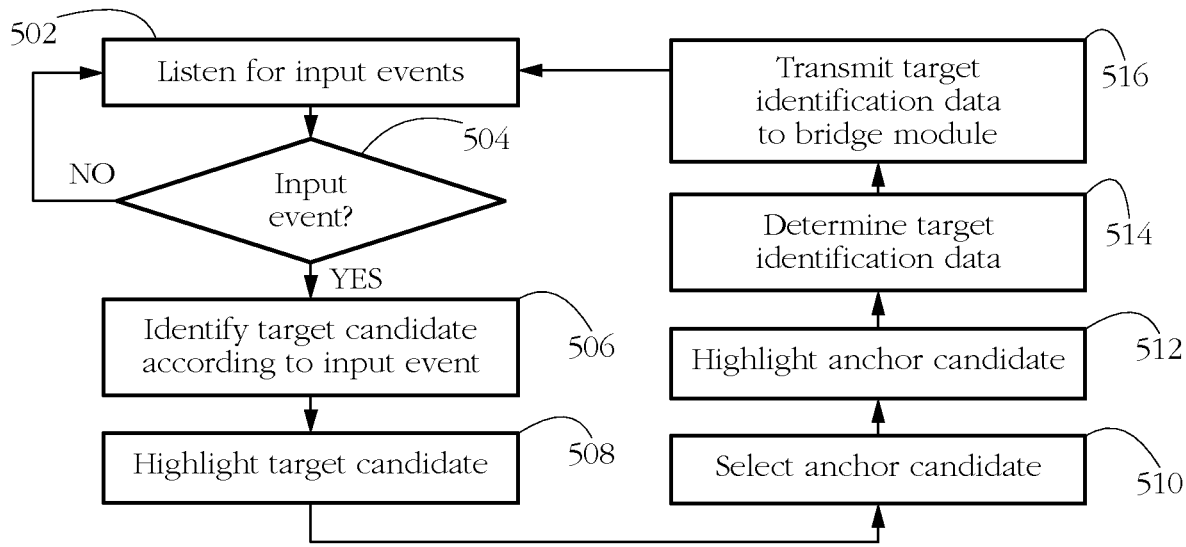
FIG. 14 shows an exemplary sequence of steps performed by an RPA driver in a robot design embodiment of the present invention.

FIG. 14 shows an exemplary sequence of steps carried out by RPA driver 25 in a robot design embodiment of the present invention. Driver 25 may be configured to listen for user input events (steps 502-504), such as movements of the pointer, mouse clicks, key presses, and input gestures such as tapping, pinching, etc. In response to detecting an input event, in a step 506 driver 25 may identify a target candidate UI element according to the event. In one example wherein the detected input event comprises a mouse event (e.g., movement of the pointer), step 506 may identify a UI element located at the current position of the pointer. In another example wherein RPA host 20 does not display a pointer, for instance on a touchscreen device, step 504 may detect a screen touch, and step 506 may identify a UI element located at the position of the touch.

Figure 15:
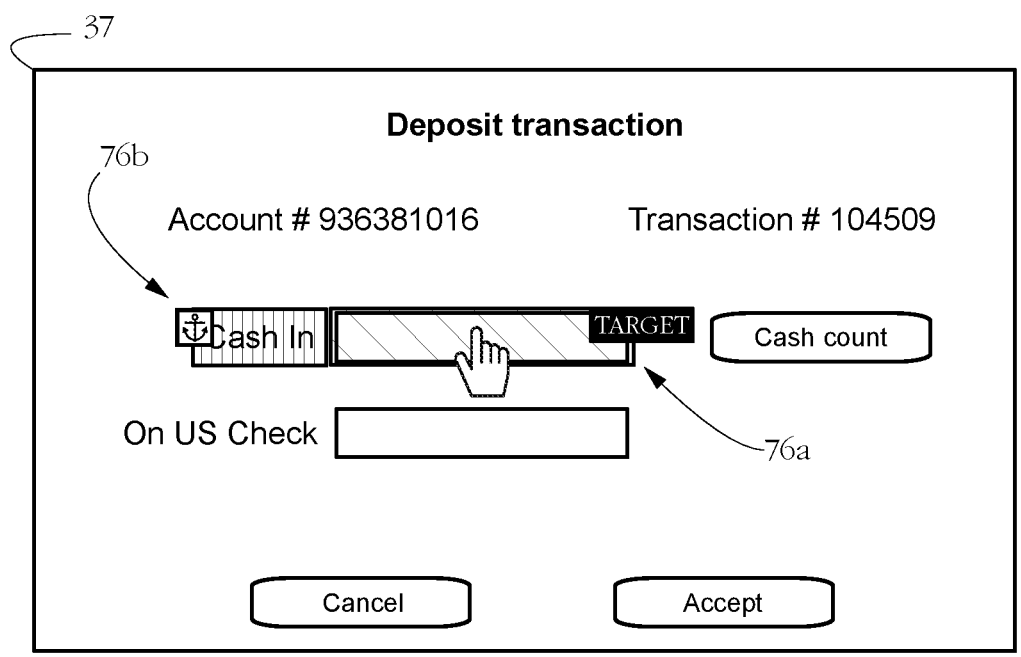
FIG. 15 shows exemplary target and anchor highlighting according to some embodiments of the present invention.

In some embodiments, a step 508 may highlight the target candidate element identified in step 508. Highlighting herein denotes changing an appearance of the respective target candidate element to indicate it as a potential target for the current RPA activity. FIG. 15 illustrates exemplary highlighting according to some embodiments of the present invention. Step 508 may comprise changing the specification (e.g., UI tree, DOM) of the respective UI to alter the look of the identified target candidate (e.g., font, size, color, etc.), or to create a new highlight element, such as exemplary highlights 76a-b shown in FIG. 15. Exemplary highlight elements may include a polygonal frame surrounding the target candidate, which may be colored, shaded, hatched, etc., to make the target candidate stand out among other elements of the target webpage. Other exemplary highlight elements may include text elements, icons, arrows, etc.

In some embodiments, identifying a target candidate automatically triggers selection of an anchor element. The anchor may be selected according to a type, position, orientation, and a size of the target candidate, among others. For instance, some embodiments select as anchors elements located in the immediate vicinity of the target candidate, preferably aligned with it. Step 510 (FIG. 14) may apply any anchor selection criterion known in the art; such criteria and algorithms go beyond the scope of the present description. In a further step 512, driver 25 may highlight the selected target element by changing its screen appearance as described above. Some embodiments use distinct highlights for the target and anchor elements (e.g., different colors, different hatch types, etc.) and may add explanatory text as illustrated. In some embodiments, steps 510-512 are repeated multiple times to select multiple anchors for each target candidate.

In a step 514, RPA driver 25 may determine target identification data characterizing the candidate target and/or the selected anchor element. To determine selector 52, some embodiments may identify the application exposing the respective UI and may parse a live UI tree/DOM of the respective UI to extract and/or formulate a set of tags and/or attribute-value pairs characterizing the candidate target element and/or anchor element. Step 514 may further include taking a snapshot of a region of the screen currently showing the candidate target and/or anchor elements to determine image data (see e.g., image 54 in FIG. 10). A text/label displayed by the target and/or anchor elements may be extracted by parsing the source code and/or by OCR procedures. In a step 516, driver 25 may transmit the target identification data determined in step 514 to bridge module 34 and/or to RPA agent 31. Such communications are carried out via channel 38 established by bridge module 34 and/or RPA agent 31.

The exemplary flowchart in FIG. 14 assumes RPA driver 25 is listening to user events, taking its own decisions, and automatically transmitting element identification data to bridge module 34 and/or agent 31. In an alternative embodiment, RPA agent 31 and/or bridge module 34 may actively request data from RPA driver 25 by way of commands or other kinds of communications transmitted via channel 38. Meanwhile, RPA driver 25 may merely execute the respective commands. For instance, agent 31 may explicitly request driver 25 to acquire a target, then to acquire an anchor. Such requests may be issued for instance in embodiments wherein the user is expected to manually select an anchor, in contrast to the description above wherein anchors are selected automatically in response to identification of a candidate target. In turn, driver 25 may only return element identification data upon request. In yet other alternative embodiments, the algorithm for automatically selecting an anchor element may be executed by RPA agent 31 and not by driver 25 as described above. For instance, agent 31 may send a request to driver 25 to identify a UI element located immediately to the left of the target, and assign the respective element as anchor. An artisan will know that such variations are given as examples and are not meant to narrow the scope of the invention.

The description above refers to an exemplary embodiment wherein bridge module 34 intermediates communication between RPA agent 31 and driver 25 (see e.g., FIG. 6), and wherein module 34 displays and populates target configuration interface 70. In another exemplary embodiment, bridge module 34 only sets up a direct communication channel between driver 25 and agent 31, while RPA agent 31 displays target configuration interface 70 within agent browser window 36, for instance as an overlay. In such embodiments, RPA driver 25 may receive target acquisition commands from agent 31 and may return target identification data to agent 31, module 34 operating merely as a relay.

The description above also focused on a version of robot design wherein the user selects from a set of activities available for execution, and then proceeds to configure each individual activity by indicating a target and other parameters. Other exemplary embodiments may implement another popular robot design scenario, wherein the robot design tools record a sequence of user actions (such as the respective user's navigating through a complex user interface) and configure a robot to reproduce the respective sequence. In some such embodiments, for each user action such as a click, scroll, type in, etc., driver 25 may be configured to determine a target of the respective action including a set of target identification data, and to transmit the respective data together with an indicator of a type of user action to RPA agent 31 via communication channel 38. RPA agent 31 may then assemble a robot specification from the respective data received from RPA driver 25.

Robot Execution Embodiments

In contrast to the exemplary embodiments illustrated above, which were directed at designing an RPA robot to perform a desired workflow, in other embodiments of the present invention RPA agent 31 comprises at least a part of RPA robot 12 configured to actually carry out an automation. For instance, RPA agent 31 may embody some of the functionality of robot manager 24 and/or robot executors 22 (see e.g., FIG. 2 and associated description above).

In one exemplary robot execution embodiment, the user may use agent browser window 36 to open a robot specification. The specification may instruct a robot to perform some activity such as filling in a form, scraping some text or images, etc., inside target UI 37. For example, an RPA package 40 may be downloaded from a remote 'robot store' by accessing a specific URL or selecting a menu item from a web interface exposed by a remote server computer. Package 40 may include a set of RPA scripts 42 formulated in a computer-readable form that enables scripts 42 to be executed by a browser process. For instance, scripts 42 may be formulated in a version of JavaScript®. Scripts 42 may comprise a specification of a sequence of RPA activities (e.g., navigating to a webpage, clicking on a button, etc.), including a set of target identification data characterizing a target/operand of each RPA activity (e.g., which button to click, which form field to fill in, etc.).

Figure 16:
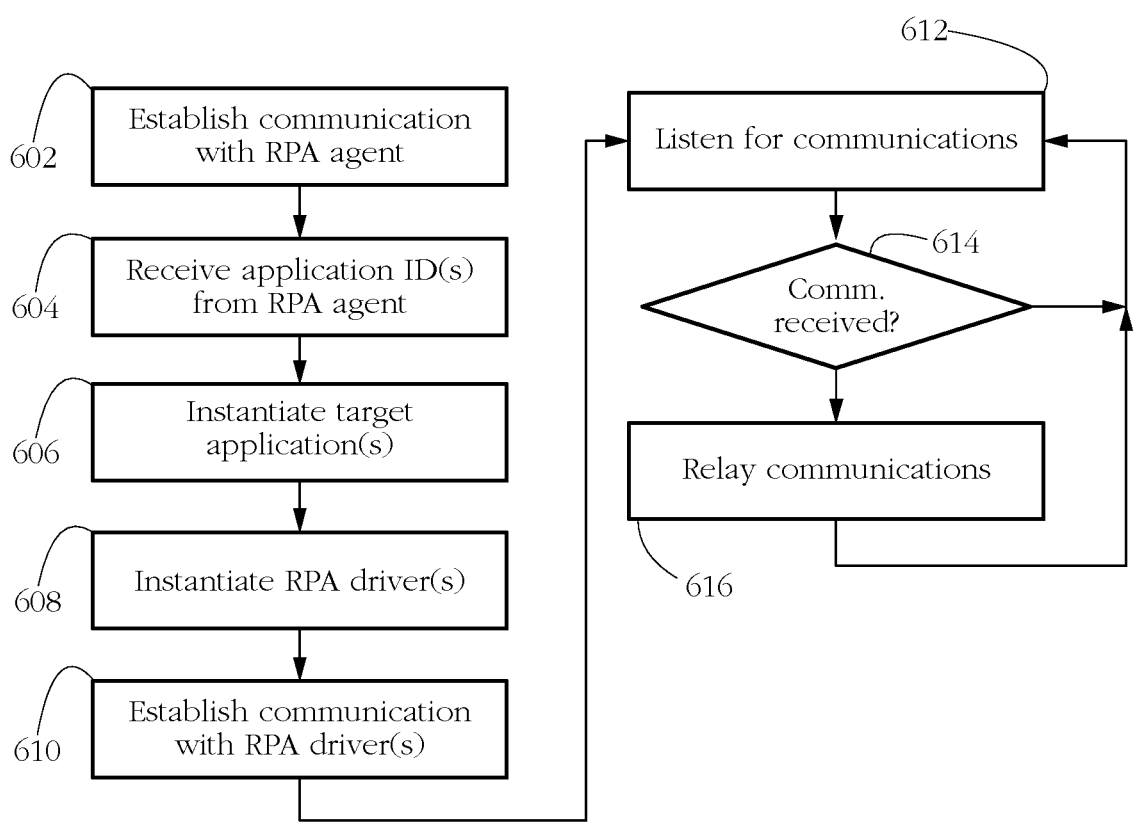
FIG. 16 illustrates an exemplary sequence of steps performed by a bridge module in a robot execution embodiment of the present invention.

FIG. 16 shows an exemplary sequence of steps performed by bridge module 34 in a robot execution embodiment of the present invention. In a step 602, module 34 may collaborate with RPA agent 31 to set up communication channel 38, for instance as described above in relation to step 302 in FIG. 12. Next, in a sequence of steps 604-606, module 34 may receive an application ID from agent 31 indicating target application 33 and/or target UI 37. In some embodiments, module 34 may be able to determine whether target UI 37 is already instantiated on RPA host 20, and if no, to start an instance of target application 33 and expose an instance of target UI 37. In a further sequence of steps 608-610, module 34 may instantiate RPA driver(s) 25 and set up communication with driver(s) 25. In situations wherein the RPA robot is configured to interact with multiple UI's (for instance to read data from a spreadsheet and paste it into an email message, etc.), steps 604-610 may be executed again for each distinct target UI. Stated otherwise, there may be a distinct instance of RPA driver 25 for each distinct target UI. Once communication is established, module 34 may relay communications between driver(s) 25 and agent 31 (steps 612-614-616).

Figure 17:
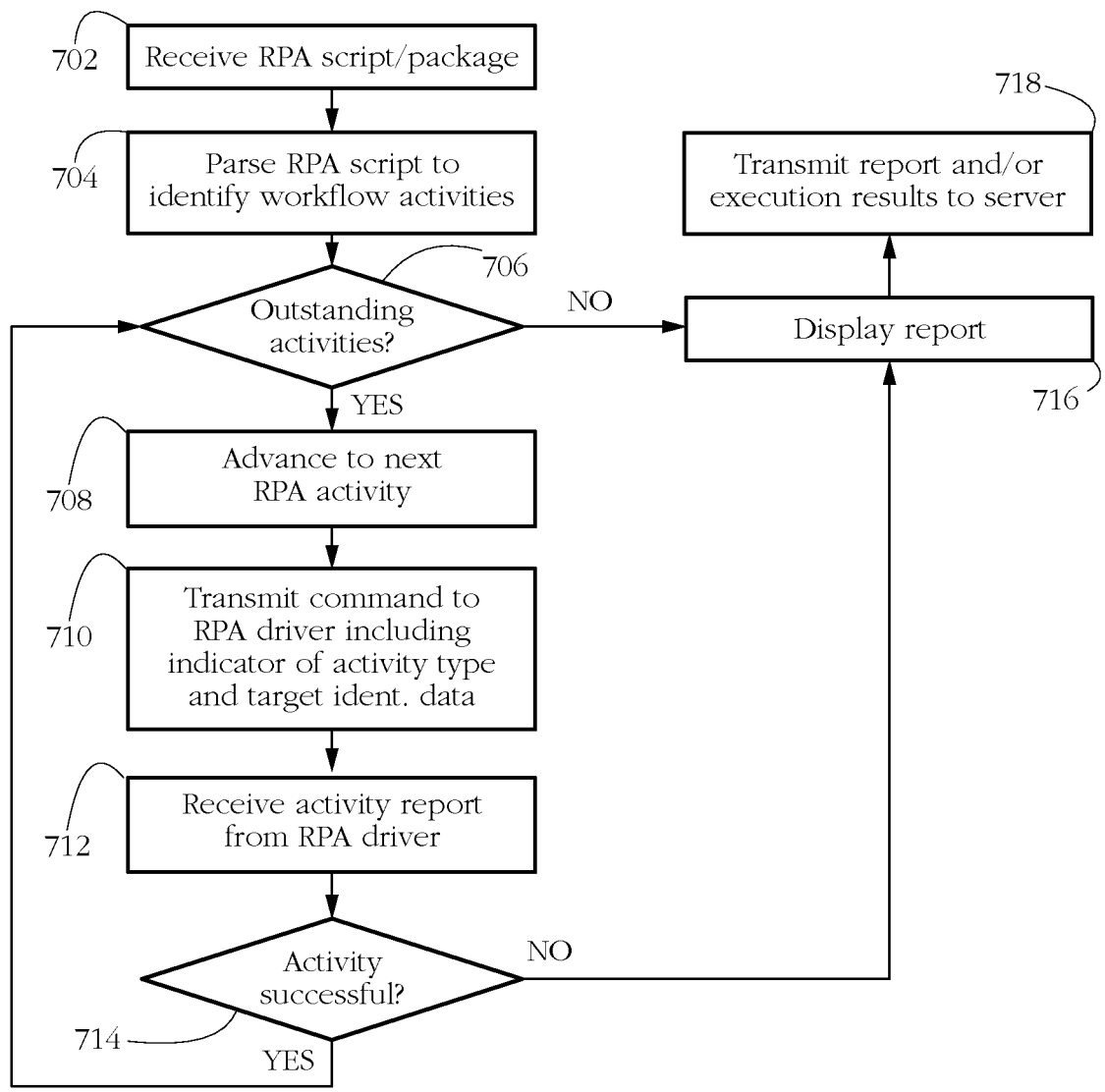
FIG. 17 shows an exemplary sequence of steps performed by an RPA agent in a robot execution embodiment of the present invention.

FIG. 17 shows an exemplary sequence of steps carried out by RPA agent 31 in a robot execution embodiment of the present invention. In response to receiving RPA package 40 in a step 702, in a step 704 agent 31 may parse the respective specification to identify activities to be executed. Then, a sequence of steps 706-708 may cycle through all activities of the respective workflow. For each RPA activity, a step 710 may transmit an execution command to RPA driver 25 via channel 38, the command comprising an indicator of a type of activity (tap, fill in, etc.) and further comprising target identification data characterizing a target/operand of the respective activity. In situations wherein the respective automation requires interacting with multiple target UIs, step 710 may comprise identifying the target UI specific to the current RPA activity, for instance according to application ID 152 included in the target identification data. Some embodiments deploy a distinct instance of RPA driver 25 with each target UI, and each such driver may use a distinct communication channel 38 to communicate with agent 31. Step 710 may therefore further comprise transmitting commands and/or target identification data via the appropriate channel.

Some embodiments may then receive an activity report from RPA driver 25 via communication channel 38, wherein the report may indicate for instance whether the respective activity was successful and may further comprise a result of executing the respective activity. In some embodiments, a step 714 may determine according to the received activity report whether the current activity was executed successfully, and when no, a step 716 may display a warning to the user within agent browser window 36. In response to completing the automation (e.g., step 706 determined that there are no outstanding activities left to execute), step 716 may display a success message and/or results of executing the respective workflow to the user. In some embodiments, a further step 718 may transmit a status report comprising results of executing the respective automation to a remote server (e.g., orchestrator 14). Said results may include, for instance, data scraped from target UI 37, an acknowledgement displayed by target UI 37 in response to successfully entering data into a form, etc.

Figure 18:
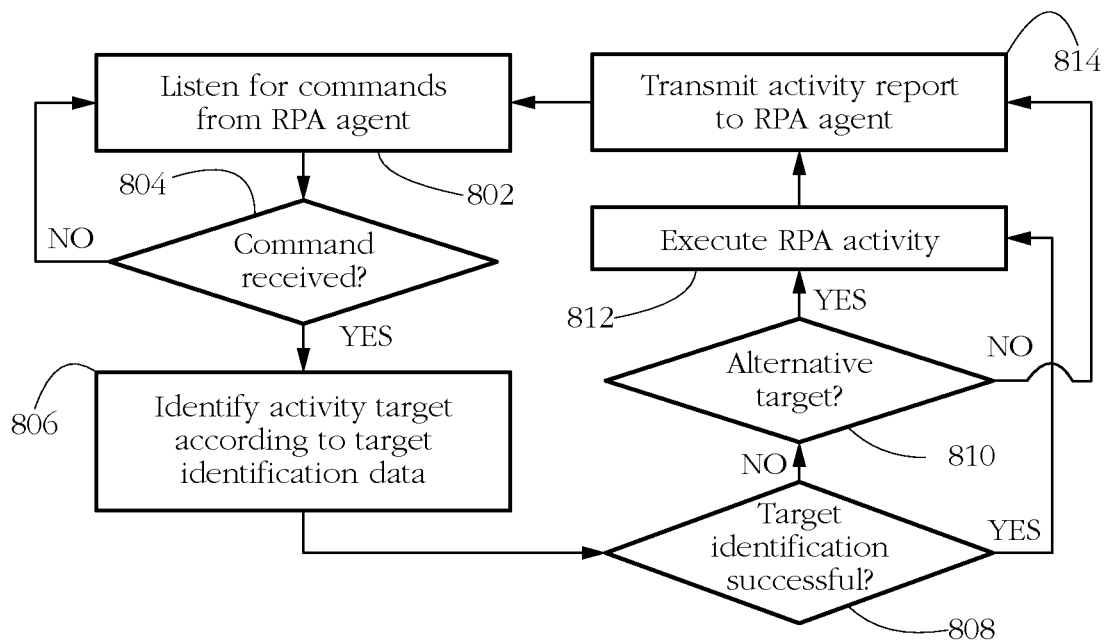
FIG. 18 shows an exemplary sequence of steps performed by an RPA driver in a robot execution embodiment of the present invention.

FIG. 18 shows an exemplary sequence of steps carried out by RPA driver 25 in a robot execution embodiment of the present invention. Driver 25 may be configured to listen for execution commands from RPA agent 31 over communication channel 38 (steps 802-804). In response to receiving a command, a step 806 may attempt to identify the target of the current activity according to target identification data received from RPA agent 31. Some robots may be configured to interact with multiple UIs, so step 806 may comprise first identifying the target UI of the current activity, for example according to an application ID 152 included as part of the target identification data. Step 806 may then comprise searching the respective UI for an element matching the respective target identification data. For instance, RPA driver 25 may parse a live UI tree/DOM of target UI 37 to identify an element whose tags and/or other attribute-value pairs match those specified in selector 52.

In some embodiments, when identification according to selector 52 fails, RPA driver 25 may attempt to find the runtime target according to image and/or text data (e.g., element image 54 and element text 56 in FIG. 10). Some embodiments may further attempt to identify the runtime target according to identification data characterizing an anchor element and/or according to a relative position and alignment of the runtime target with respect to the anchor. Such procedures and algorithms go beyond the scope of the current description.

When target identification is successful (a step 808 returns a YES), a step 812 may execute the current RPA activity, for instance click on the identified button, fill in the identified form field, etc. Step 812 may comprise manipulating target UI 37 and/or generating an input event (e.g., a click, a tap, etc.) to reproduce a result of a human operator actually carrying out the respective action.

When the runtime target of the current activity cannot be identified according to target identification data received from RPA agent 31 (for instance in situations wherein the appearance of target UI 37 has changed substantially between design time and runtime), some embodiments transmit an error message/report to RPA agent 31 via communication channel 38. In an alternative embodiment, RPA driver 25 may search for an alternative target. In one such example, driver 25 may identify an element of target UI 37 approximately matching the provided target identification data. Some embodiments identify multiple target candidates partially matching the desired target characteristics and compute a similarity measure between each candidate and the design-time target. An alternative target may then be selected by ranking the target candidates according to the computed similarity measure. In response to selecting an alternative runtime target, some embodiments of driver 25 may highlight the respective UI element, for instance as described above in relation to FIG. 15, and request the user to confirm the selection. In yet another exemplary embodiment, driver 25 may display a dialog indicating that the runtime target could not be found and instructing the user to manually select an alternative target. Driver 25 may then wait for user input. Once the user has selected an alternative target (e.g., by clicking, tapping, etc., on a UI element), RPA driver 25 may identify the respective element within target UI 37 using methods described above in relation to FIG. 14 (step 506). When an alternative runtime target is available (a step 810 returns a YES), driver 25 may apply the current activity to the alternative target (step 812).

When for any reason driver 25 cannot identify any alternative target, in some embodiments a step 814 returns an activity report to RPA agent 31 indicating that the current activity could not be executed because of a failure to identify the runtime target. In some embodiments, the activity report may further identify a subset of the target identification data that could not be matched in any element of the target webpage. Such reporting may facilitate debugging. When the current activity was successfully executed, the report sent to RPA agent 31 may comprise a result of executing the respective activity. In an alternative embodiment, step 814 may comprise sending the activity report and/or a result of executing the respective activity to a remote server computer (e.g., orchestrator 14) instead of the local RPA agent.

Figure 19:
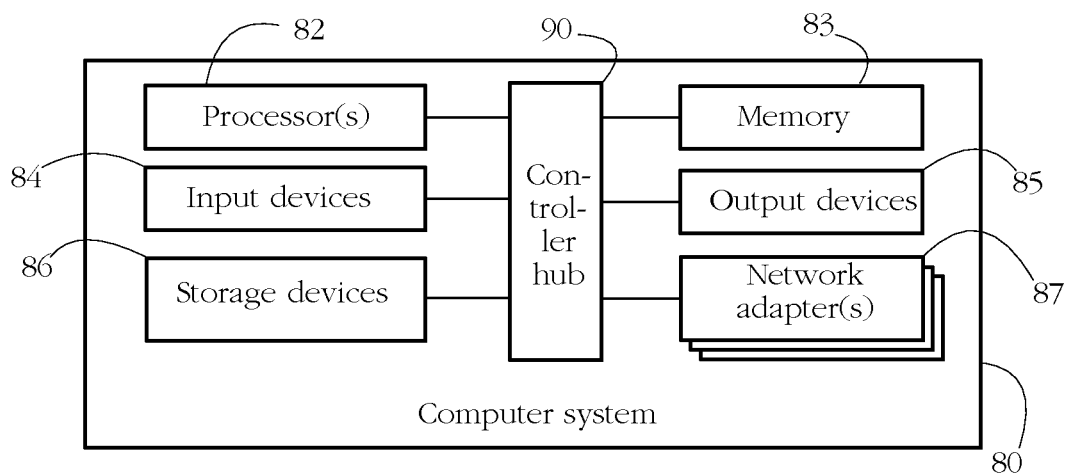
FIG. 19 illustrates an exemplary hardware configuration of a computer system programmed to execute some of the methods described herein.

FIG. 19 illustrates an exemplary hardware configuration of a computer system 80 programmable to carry out some of the methods and algorithms described herein. The illustrated configuration is generic and may represent for instance any RPA host 20a-e in FIG. 4. An artisan will know that the hardware configuration of some devices (e.g., mobile telephones, tablet computers, server computers) may differ somewhat from the one illustrated in FIG. 19.

The illustrated computer system comprises a set of physical devices, including a hardware processor 82 and a memory unit 84. Processor 82 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 82 in the form of a sequence of processor instructions (e.g. machine code or other type of encoding). Memory unit 84 may comprise volatile computer-readable media (e.g. DRAM, SRAM) storing instructions and/or data accessed or generated by processor 82.

Input devices 86 may include computer keyboards, mice, and microphones, among others, including the respective hardware interfaces and/or adapters allowing a user to introduce data and/or instructions into the respective computer system. Output devices 88 may include display devices such as monitors and speakers among others, as well as hardware interfaces/adapters such as graphic cards, allowing the illustrated computing appliance to communicate data to a user. In some embodiments, input devices 86 and output devices 88 share a common piece of hardware, as in the case of touch-screen devices. Storage devices 92 include computer-readable media enabling the non-volatile storage, reading, and writing of software instructions and/or data. Exemplary storage devices 92 include magnetic and optical disks and flash memory devices, as well as removable media such as CD and/or DVD disks and drives. The set of network adapters 94, together with associated communication interface(s), enables the illustrated computer system to connect to a computer network (e.g., network 13 in FIG. 4) and/or to other devices/computer systems. Controller hub 90 generically represents the plurality of system, peripheral, and/or chipset buses, and/or all other circuitry enabling the communication between processor 82 and devices 84, 86, 88, 92, and 94. For instance, controller hub 90 may include a memory controller, an input/output (I/O) controller, and an interrupt controller, among others. In another example, controller hub 90 may comprise a northbridge connecting processor 82 to memory 84, and/or a southbridge connecting processor 82 to devices 86, 88, 92, and 94.

The exemplary systems and methods described above facilitate the uptake of RPA technologies by enabling RPA software to execute on virtually any host computer, irrespective of its hardware type and operating system. As opposed to RPA software conventionally distributed as a separate self-contained software application, in some embodiments of the present invention at least a part of the RPA software comprises a set of scripts that execute within a web browser such as Google Chrome®, among others. Said scripts may be formulated in a scripting language such as JavaScript® or some version of bytecode which browsers are capable of interpreting.

Whereas in conventional RPA separate versions of the software must be developed for each hardware platform (i.e., processor family) and/or each operating system (e.g., Microsoft Windows® vs. Linux®), some embodiments of the present invention allow the same set of scripts to be used on any platform and operating system which can execute a web browser with script interpretation functionality. On the software developer's side, removing the need to build and maintain multiple versions of a robot design application may substantially facilitate software development and reduce time-to-market. Client-side advantages include a reduction in administration costs by removing the need to purchase, install, and upgrade multiple versions of RPA software, and further simplifying the licensing process. Individual RPA developers may also benefit by being able to design, test, and run automations from their own computers, irrespective of operating system.

When automations require that the robot interact with non-browser applications (e.g., spreadsheet applications, email, instant messaging, etc.), a part of the RPA software may still execute outside of the browser. In some embodiments of the present invention, such components include a driver that needs to be OS and/or hardware-specific. However, such a component is typically orders of magnitude less sophisticated than a robot design interface, for instance. Therefore, having to develop and maintain OS and/or platform-specific drivers may be an acceptable price to pay for the convenience of moving the bulk of RPA software to the browser. Furthermore, leaving the driver outside of the browser has other important advantages, for instance enabling a robot to interact with multiple target applications, as in reading data from a spreadsheet and pasting it into an email program.

However, performing RPA in a mixed configuration wherein a part of the software executes inside the browser and another one executes outside presents substantial technical challenges, by explicitly going against the browser's code isolation policy. To overcome such hurdles, some embodiments set up a communication channel between the RPA components to allow exchange of messages, such as target identification data and status reports. One exemplary embodiment uses a browser extension mechanism to set up such communication channels. Other exemplary embodiments use a local and/or remote server to pass messages between the respective components.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to execute a web browser application, a robotic process automation (RPA) driver, and a bridge module, wherein:

the bridge module comprises a first part and a second part, the first part executing within the web browser application as a browser extension, the second part executing outside of the web browser application, and the bridge module is configured to set up a communication channel between the web browser application and the RPA driver, wherein setting up the communication channel comprises registering the second part as a local messaging host of the browser extension;

the web browser application is configured to:

receive a specification of a RPA workflow from a remote server computer, the RPA workflow comprising a sequence of RPA activities for interacting with a target user interface (UI) of an RPA target application executing outside of the web browser application, on the computer system, select an RPA activity for execution from the RPA workflow, the RPA activity comprising mimicking an action of a user on a target element of the target UI, and in response to selecting the RPA activity, selectively transmit a set of target identification data characterizing the target element via the communication channel; and the RPA driver executes outside of the web browser application and is configured to:
  receive the set of target identification data via the communication channel,
  in response, identify the target element within the target UI according to the target identification data, and
  carry out the RPA activity.

2. The method of claim 1, wherein:
the RPA driver is further configured to transmit a result of carrying out the RPA activity via the communication channel; and
the web browser application is further configured to receive the result via the communication channel and in response, to generate a display according to the result.

3. The method of claim 2, wherein the web browser application is further configured to transmit the result to the remote server computer.

4. The method of claim 1, wherein the RPA driver is further configured, in response to a failure to identify the target element, to automatically select an alternative target element from within the target UI.

5. The method of claim 4, wherein the RPA driver is further configured, in response to selecting an alternative target element, to change an appearance of the alternative target element to highlight the alternative target element with respect to other elements of the target UI.

6. The method of claim 1, wherein the RPA driver is further configured, in response to a failure to identify the target element, to transmit an activity report via the communication channel, the activity report identifying a subset of the target identification data that could not be matched to any element of the target UI.

7. The method of claim 1, wherein:
the bridge module is further configured to set up another communication channel between the web browser application and another RPA driver executing on the computer system outside of the web browser application;
the web browser application is further configured to:
  select another RPA activity for execution from the RPA workflow, the other RPA activity comprising mimicking another action of the user on another target element of another UI exposed by the computer system, and
  transmit another set of target identification data characterizing the other target element via the other communication channel; and
wherein the other RPA driver is configured to:
  receive the set of target identification data via the other communication channel,
  in response, identify the other target element within the other UI according to the other target identification data, and
  carry out the other RPA activity.

8. The method of claim 1, wherein the web browser application is further configured to:
in response to transmitting the set of target identification data, select another RPA activity for execution from the RPA workflow, the other RPA activity comprising mimicking another action of the user on another target element of the target UI; and in response, selectively transmit another set of target identification data via the communication channel, the other set of target identification data characterizing the other target element.

9. The method of claim 1, wherein the web browser application is further configured, in response to selecting the RPA activity, to selectively transmit an execution command to the RPA driver via the communication channel, the execution command comprising an indicator of an activity type of the selected RPA activity.

10. A computer system comprising at least one hardware processor configured to execute a web browser application, a robotic process automation (RPA) driver, and a bridge module, wherein:
the bridge module comprises a first part and a second part, the first part executing within the web browser application as a browser extension, and a second part executing outside of the web browser application, and
the bridge module is configured to set up a communication channel between the web browser application and the RPA driver, wherein setting up the communication channel comprises registering the second part as a local messaging host of the browser extension;
the web browser application is configured to:
  receive a specification of an RPA workflow from a remote server computer, the RPA workflow comprising a sequence of RPA activities for interacting with a target user interface (UI) of an RPA target application executing outside of the web browser application, on the computer system,
  select an RPA activity for execution from the RPA workflow, the RPA activity comprising mimicking an action of a user on a target element of the target UI, and
  in response to selecting the RPA activity, selectively transmit a set of target identification data characterizing the target element via the communication channel; and
the RPA driver executes outside of the web browser application and is configured to:
  receive the set of target identification data via the communication channel,
  in response, identify the target element within the target UI according to the target identification data, and
  carry out the RPA activity.

11. The computer system of claim 10, wherein:
the RPA driver is further configured to transmit a result of carrying out the RPA activity via the communication channel; and
the web browser application is further configured to receive the result via the communication channel and in response, to generate a display according to the result.

12. The computer system of claim 11, wherein the web browser application is further configured to transmit the result to the remote server computer.

13. The computer system of claim 10, wherein the RPA driver is further configured, in response to a failure to identify the target element, to automatically select an alternative target element from within the target UI.

14. The computer system of claim 13, wherein the RPA driver is further configured, in response to selecting an alternative target element, to change an appearance of the alternative target element to highlight the alternative target element with respect to other elements of the target UI.

15. The computer system of claim 10, wherein the RPA driver is further configured, in response to a failure to identify the target element, to transmit an activity report via the communication channel, the activity report identifying a subset of the target identification data that could not be matched to any element of the target UI.

16. The computer system of claim 10, wherein:
the bridge module is further configured to set up another communication channel between the web browser application and another RPA driver executing on the computer system outside of the web browser application;
the web browser application is further configured to:
select another RPA activity for execution from the RPA workflow, the other RPA activity comprising mimicking another action of the user on another target element of another UI exposed by the computer system, and
transmit another set of target identification data characterizing the other target element via the other communication channel; and
wherein the other RPA driver is configured to:
receive the set of target identification data via the other communication channel,
in response, identify the other target element within the other UI according to the other target identification data, and
carry out the other RPA activity.

17. The computer system of claim 10, wherein the web browser application is further configured to:
in response to transmitting the set of target identification data, select another RPA activity for execution from the RPA workflow, the other RPA activity comprising mimicking another action of the user on another target element of the target UI; and
in response, selectively transmit another set of target identification data via the communication channel, the other set of target identification data characterizing the other target element.

18. The computer system of claim 10, wherein the web browser application is further configured, in response to selecting the RPA activity, to selectively transmit an execution command to the RPA driver via the communication channel, the execution command comprising an indicator of an activity type of the selected RPA activity.

19. A non-transitory computer-readable medium storing instructions which, when executed by at least one hardware processor of a computer system further executing a web browser application, cause the computer system to form a bridge module and an RPA driver, wherein:
the bridge module comprises a first part and a second part, the first part executing within the web browser application as a browser extension, the second part executing outside of the web browser application, and
the bridge module is configured to set up a communication channel between the web browser application and the RPA driver, wherein setting up the communication channel comprises registering the second part as a local messaging host of the browser extension;
the web browser application is configured to:
receive a specification of an RPA workflow from a remote server computer, the RPA workflow comprising a sequence of RPA activities for interacting with a target user interface (UI) of an RPA target application executing outside of the web browser application, on the computer system,
select an RPA activity for execution from the RPA workflow, the RPA activity comprising mimicking an action of a user on a target element of the target UI, and
in response to selecting the RPA activity, selectively transmit a set of target identification data characterizing the target element via the communication channel; and
the RPA driver executes outside of the web browser application and is configured to:
receive the set of target identification data via the communication channel,
in response, identify the target element within the target UI according to the target identification data, and
carry out the RPA activity.

\* \* \* \* \*